United States Patent [19]
Tanimura et al.

[11] Patent Number: 5,888,271
[45] Date of Patent: Mar. 30, 1999

[54] OZONE STORING METHOD AND OZONE STORAGE SYSTEM

[75] Inventors: Yasuhiro Tanimura; Masaki Kuzumoto; Junji Hirotsuji; Shigeki Nakayama, all of Tokyo, Japan

[73] Assignee: Mitsubishi Denki Kabushiki Kaisha, Tokyo, Japan

[21] Appl. No.: 808,356

[22] Filed: Feb. 28, 1997

[30] Foreign Application Priority Data

Mar. 1, 1996 [JP] Japan ................................. 8-044935

[51] Int. Cl.$^6$ ................................. B01D 53/047

[52] U.S. Cl. ................. 95/12; 95/97; 95/104; 95/138; 96/111; 96/130; 96/133; 96/144

[58] Field of Search ................. 95/8, 11, 12, 96–98, 95/102–105, 138; 96/111, 122, 130, 133, 144

[56] References Cited

U.S. PATENT DOCUMENTS

| Re. 29,941 | 3/1979 | Bird | 95/11 |
|---|---|---|---|
| 2,872,397 | 2/1959 | Kiffer | 95/104 X |
| 3,134,656 | 5/1964 | Donohue et al. | 95/138 |
| 4,421,533 | 12/1983 | Nishino et al. | 95/138 |
| 4,430,306 | 2/1984 | Namba et al. | 422/292 |
| 4,453,953 | 6/1984 | Tanaka et al. | 55/163 |
| 4,462,965 | 7/1984 | Azuma et al. | 422/186.08 |
| 4,552,659 | 11/1985 | Tabata et al. | 210/177 |
| 4,604,279 | 8/1986 | Leitzke et al. | 95/96 X |
| 4,786,489 | 11/1988 | Grenier et al. | 95/138 X |
| 5,039,314 | 8/1991 | Lehner et al. | 95/98 |
| 5,423,902 | 6/1995 | Strutz et al. | 95/138 X |
| 5,507,957 | 4/1996 | Garrett et al. | 95/96 X |
| 5,730,786 | 3/1998 | Sanui et al. | 95/11 X |

FOREIGN PATENT DOCUMENTS

| 52-3595 | 1/1975 | Japan . | |
|---|---|---|---|
| 52-039793 | 10/1977 | Japan | 95/138 |
| 53-010390 | 1/1978 | Japan | 95/8 |
| 54-24293 | 2/1979 | Japan . | |
| 55-020267 | 2/1980 | Japan | 95/104 |
| 55-61984 | 5/1980 | Japan . | |
| 55-158106 | 12/1980 | Japan | 96/111 |
| 56-14002 | 11/1981 | Japan . | |
| 63-14803 | 6/1988 | Japan . | |

*Primary Examiner*—Robert Spitzer
*Attorney, Agent, or Firm*—Sughrue, Mion, Zinn, Macpeak & Seas, PLLC

[57] ABSTRACT

An ozone storage system which allows energy required for producing and storing ozone to be reduced and which supplies ozone as stored to an ozone consumer stably in continuation. The system includes an ozone generator (1) for generating an ozonized oxygen gas from an oxygen containing gas by using electric energy, an adsorption/desorption tower (4) including an adsorbent for adsorbing ozone from the ozonized oxygen gas and desorbing apparatus for desorbing ozone from the adsorbent, a circulation pipe (L1) for feeding back the oxygen containing gas to the ozone generator after adsorption of ozone in the tower, an ozone discharging apparatus (11) for discharging ozone desorbed from the tower, an ozone concentration controlling apparatus (14) for adjusting an amount of ozone extracted through the ozone discharging apparatus to thereby supply an ozone containing gas containing ozone substantially at a predetermined constant concentration to an ozone consumer (15), and a low-temperature processing unit (20) for separating oxygen from air to feed an oxygen gas to the ozone generator (1).

15 Claims, 28 Drawing Sheets

OZONE STORING METHOD AND OZONE STORAGE SYSTEM

BACKGROUND OF THE INVENTION

1. Field of the Invention

The present invention relates to an ozone storage system and an ozone storing method for generating or producing ozone gas by making use of electric energy and storing the ozone gas for supplying it to an ozone consumer continuously at a given flow rate, as it is demanded.

2. Description of Related Art

For having better understanding of the invention, technical background thereof will first be reviewed in some detail. FIG. 28 is a schematic diagram showing generally a system configuration of a conventional intermittent-operation type ozone supply system which is known heretofore and disclosed, for example, in Japanese Unexamined Patent Application Publication No. 3595/1977 (JP-A-52-3595) and which is a typical one of the conventional ozone storage systems. The ozone storage system now of concern is primarily designed for storage of ozone. Referring to the figure, an oxygen containing gas fed from an oxygen supplying source 2 undergoes ozonization under the action of electric discharge within an ozone generator (which is also referred to as the ozonizer) 1. To this end, a circulating blower 3 is provided for feeding the oxygen containing gas supplied from the oxygen supplying source 2 to the ozone generator 1 by way of a circulating pipe L1 as well as for feeding the ozonized oxygen gas as generated to an adsorption/desorption tower 4 for the storage of the ozonized oxygen gas therein.

The ozone storage system further includes a coolant supply source 5 implemented in the form of a refrigerator for generating a refrigerating gas circulated to the adsorption/desorption tower 4 by way of a circulating pipe L2, a heating medium source 6 for generating a heating medium to be circulated to and through the adsorption/desorption tower 4 by way of a circulating pipe L3, and a water ejector 7. The water ejector 7 is so arranged as to extract (desorb) ozone gas under depressurization from the ozonized oxygen gas stored or reserved temporarily within the adsorption/desorption tower 4. Ozone as extracted is then dispersed in water serving as ozone carrier. Thus, ozone can be supplied to the ozone consumer (not shown) in the form of ozone containing water.

Furthermore, in the ozone storage system, there are installed in the circulating pipe L2 change-over valves 8-1 and 8-2 at locations upstream and downstream of the coolant supply source 5, respectively. Additionally, a change-over valve 8-3 is installed in the circulating pipe L1 between a discharge port of the adsorption/desorption tower 4 and a suction or inlet side of the circulating blower 3, while a change-over valve 8-4 is mounted in the pipe L1 between a discharge port of the ozone generator 1 and a suction or inlet port of the adsorption/desorption tower 4. Finally, change-over valves 8-5 and 8-7 are installed in the circulating pipe L3 at locations upstream and downstream of the heating medium source 6, respectively, for the purpose of controlling a heating medium to be supplied to the adsorption/desorption tower 4.

The adsorption/desorption tower 4 is implemented in a double-drum or double-cylinder structure, wherein the inner drum or cylinder is filled with an adsorbent while the outer drum or cylinder is filled with a heat transfer medium. Parenthetically, silica gel is commonly used as the adsorbent with ethylene glycol or alcohols being used as the heat transfer medium. The circulating blower 3, the ozone generator 1 and the adsorption/desorption tower 4 are interconnected in this order by the circulating pipe L1 to thereby constitute an ozone gas circulation system.

Next, description will turn to operation of the conventional ozone storage system. Operation of the ozone storage system may globally be classified into two operation modes, i.e., an ozone adsorbing operation mode and an ozone desorbing operation mode.

Description will first be directed to the ozone adsorbing operation. In this operation mode, oxygen gas is supplied from the oxygen supplying source 2, whereby the ozone gas circulation system is maintained constantly at a predetermined pressure. In practical applications, this pressure is usually set at 1.5 kg/cm$^2$. When oxygen gas is caused to flow through the ozone gas circulation system by means of the circulating blower 3 in the state in which the change-over valves 8-3 and 8-4 are opened, a part of the oxygen gas flow is transformed into ozone (i.e., ozonized) under the effect of silent electric discharge when the oxygen gas flows through an electric discharge gap defined between electrodes disposed within the ozone generator 1, whereby an ozonized oxygen gas is produced to be subsequently transported to the adsorption/desorption tower 4.

In this state, a refrigerating gas is supplied to the adsorption/desorption tower 4 from the coolant supply source 5 through the change-over valves 8-1 and 8-2 which are opened at this time point. As a consequence, the adsorbent charged in the adsorption/desorption tower 4 is cooled by the refrigerating gas to a temperature not higher than −30° C. The adsorbent charged in the adsorption/desorption tower 4 adsorbs selectively ozone molecules from the ozonized oxygen gas, wherein residual oxygen gas is fed back to the circulating blower 3 through the pipe L1 by way of the change-over valve 8-3. An amount of oxygen consumed in the ozonization process is supplemented from the oxygen supplying source 2.

The amount of ozone molecules adsorbed by the adsorbent (hereinafter also referred to as the ozone adsorption quantity) remarkably vary in dependence on the temperature of the adsorbent. More specifically, the ozone adsorption quantity increases as the temperature of the adsorbent lowers, whereas the ozone adsorption quantity decreases as the temperature of the adsorbent rises. Accordingly, cooling of the adsorbent is effective for promoting the adsorption of ozone. On the other hand, the temperature of the adsorbent should be increased for the desorption of ozone from the adsorbent.

When the ozone adsorbent reaches a saturated ozone adsorption level, operation of the ozone storage system is changed over to the ozone desorbing operation mode. In this case, operations of the ozone generator 1, the circulating blower 3 and the coolant supply source 5 are stopped with the change-over valves 8-1, 8-2, 8-3 and 8-4 being closed. Subsequently, the heating medium source 6 and the water ejector 7 are put into operation with the change-over valves 8-5 and 8-7 being opened. When the change-over valves 8-5 and 8-7 are opened, a heating medium is fed to the adsorption/desorption tower 4 from the heating medium supply source 6. As a result of this, temperature of the adsorption/desorption tower 4 increases to thereby facilitate or promote desorption of the ozone molecules from the adsorbent.

When the change-over valve 8-6 is opened, ozone desorbed from the adsorbent filled in the adsorption/desorption tower 4 is drawn or drained into the water ejector 7 under the effect of depressurization to be thereby dispersed and solved in water. Thus, ozone can be fed to the ozone gas consumer in the form of ozone containing water. Due to the suction of ozone under depressurization, the pressure prevailing within the adsorption/desorption tower 4 will attain ca. 100 Torr. Upon completion of the desorption operation phase or mode, operation of the ozone storage system is changed over again to the ozone adsorption mode. In this manner, operation of the ozone storage system is performed repetitionally in a continuous manner.

With the structure of the conventional intermittent-operation type ozone supply system in which ozone is dispersed and solved in water in the desorption operation mode for supplying ozone to the ozone consumer in the form of ozone containing water, as described above, ozone will be extinct on the way to the ozone consumer because of short lifetime of ozone in water. Thus, the ozone supply system known heretofore suffers a problem that a continuous ozone supply to the ozone consumer at a predetermined rate is difficult or impossible. Furthermore, because ozone once dispersed and solved in water is extracted, utilization of ozone is essentially limited to water treatments because of short lifetime of ozone in water, giving rise to another inconvenience.

On the other hand, in the ozone adsorption operation mode, it is required to increase the partial pressure of ozone in the ozonized oxygen gas in order to realize adsorption of ozone by the adsorbent with a high efficiency. In that case, however, the ozone production efficiency of the ozone generating apparatus becomes lowered, involving a problem that storage of ozone with a desired efficiency is rendered difficult or impossible.

SUMMARY OF THE INVENTION

In the light of the state of the art described above, it is an object of the present invention to provide an ozone storing method which is capable of storing or reserving ozone produced by using electric energy and which allows ozone as stored to be supplied to an ozone consumer stably in continuation.

Another object of the present invention is to provide an ozone storage system in which the cold of liquid oxygen supplied as a raw material or substance for the production of ozone can be effectively made use of.

Yet another object of the present invention is to provide an ozone storage system in which electric power consumption required for cooling an adsorbing/desorbing apparatus or tower in the ozone adsorption/storage operation can be reduced.

Still another object of the present invention is to provide an ozone storage system in which electric power consumption involved in generation of ozone can be reduced while allowing the adsorbing/desorbing apparatus for storage of ozone to be implemented in a small size.

It is a further object of the present invention to provide an ozone storage system which is capable of supplying an ozone containing gas containing ozone at a predetermined concentration to an ozone consumer stably and continuously at a predetermined or constant flow rate.

It is a yet further object of the present invention to provide an ozone storage system which is capable of cooling effectively or efficiently the adsorbent filled in an adsorption/desorption tower.

It is a still further object of the present invention to provide an ozone storage system which is capable of processing or treating stored ozone speedily with safety even when some abnormality takes place in the state where ozone is stored.

In view of the above and other objects which will become apparent as the description proceeds, there is provided according to a first general aspect of the present invention an ozone storing method, which includes the steps of generating an ozonized oxygen gas from an oxygen containing gas with the aid of an ozone generating means by using electric energy, and supplying the ozonized oxygen gas to at least one adsorption/desorption means to thereby allow ozone to be adsorbed for the storage by the adsorption/desorption means, wherein in the step of adsorbing ozone by the adsorption/desorption means, partial pressure of ozone contained in the ozonized oxygen gas is increased gradually or incrementally.

According to a second aspect of the present invention, there is provided an ozone storing method, which includes the steps of generating an ozonized oxygen gas from an oxygen containing gas by means of an ozone generating means by using electric energy, supplying the ozonized oxygen gas to at least one adsorption/desorption means to thereby allow ozone to be adsorbed for the storage by the adsorption/desorption means, and extracting ozone stored in the adsorption/desorption means by supplying a desorption inducing gas to the adsorption/desorption means while maintaining a negative pressure within the adsorption/desorption means, wherein in the ozone extracting step, a flow rate of the desorption inducing gas is so regulated so as to allow ozone to be desorbed with a predetermined constant desorption rate.

In a preferred mode for carrying out the method mentioned just above, the desorption inducing gas may be an oxygen gas.

According to another general aspect of the present invention, there is provided an ozone storage system which includes an ozone generating means for generating an ozonized oxygen gas from an oxygen containing gas, an adsorption/desorption means including adsorbing means for selectively adsorbing ozone molecules from the ozonized oxygen gas by an adsorbent and desorbing means for desorbing ozone molecules from the adsorbent, a circulation path means for feeding back the oxygen containing gas to the ozone generating means after adsorption of ozone by the adsorption/desorption means, an ozone discharging means for discharging ozone molecules desorbed from the adsorption/desorption means, and an ozone concentration controlling means for adjusting an amount of ozone molecules extracted through the ozone discharging means to thereby supply an ozone containing gas which contains ozone molecules substantially constantly at a predetermined concentration to an ozone consumer.

In a preferred mode for carrying out the invention described just above, the ozone discharging means may include an ozone flow rate regulating means for regulating the rate at which ozone is discharged with the aid of the ozone concentration control means, and an ozone suction pump means for sucking or drawing ozone from the adsorption/desorption means by way of the ozone flow rate regulating means.

In another preferred mode for carrying out the invention, the ozone concentration control means mentioned above may include a gas mixing means for mixing ozone discharged under the effect of suction performed by the ozone discharging means with a carrier gas, wherein an ozone containing gas resulting from the mixing is supplied to the ozone consumer.

In yet another preferred mode for carrying out the invention, the ozone discharging means mentioned previously may include a compressed carrier gas introducing means for introducing a compressed carrier gas into the adsorption/desorption means, an ozone extracting means for extracting ozone molecules from the adsorption/desorption means by suction under depressurization by way of the ozone flow rate regulating means, and a gas ejector means for mixing ozone with the compressed carrier gas to thereby supply an ozone containing gas to the ozone consumer.

In still another preferred mode for carrying out the invention, the ozone storage system may further include a low-temperature processing means for generating at least liquid oxygen by liquidizing air as introduced and separating oxygen therefrom, wherein liquid oxygen is vaporized to be thereby transformed into an oxygen containing gas which is then supplied to the ozone generating means.

In a further preferred mode for carrying out the invention, the ozone storage system may further include a heat exchanging means for transferring heat carried by the ozonized oxygen gas discharged from the ozone generating means to the oxygen containing gas discharged from the adsorption/desorption means and fed back to the circulation path means.

In a yet further preferred mode for carrying out the invention, the ozone storage system may further include a pressure regulating means for changing pressure within the circulation path means through which the ozonized oxygen gas and the oxygen containing gas flow.

In still further preferred mode for carrying out the invention, the ozone storage system may further include an ozone concentration regulating means for regulating concentration of ozone contained in the ozonized oxygen gas supplied to the adsorption/desorption means.

In a further preferred mode for carrying out the invention, the ozone discharging means may include an oxygen gas introducing means for introducing an oxygen gas flow to the adsorption/desorption means later in an ozone desorbing process to thereby promote substitution of ozone adsorbed by oxygen introduced.

In another preferred mode for carrying out the invention, the ozone storage system may further include a bypass pipe means provided for a circulation path means for circulating an oxygen gas between the adsorption/desorption means and the ozone generating means so that a part of oxygen gas is supplied to the adsorption/desorption means, and a cooling means provided in association with the bypass pipe means for cooling the oxygen gas flowing through the bypass pipe means.

Furthermore, the ozone storage system according to the invention may include a plurality of adsorption/desorption means disposed in a serial array, wherein ozonized oxygen gas outlets and ozonized oxygen gas inlets of adjacent ones of the plural adsorption/desorption means may be connected in series by pipes having change-over valves, a respectively, so that the plurality of adsorption/desorption means constitute adsorption/desorption stages in series, respectively. At each adsorption/desorption stage, the adsorbent of corresponding adsorption/desorption means adsorbs ozone upon reception of the ozonized oxygen gas introduced from the adjacent adsorption/desorption means by way of the pipe. In this system, desorption of ozone may be started from the adsorption/desorption means corresponding to the final adsorption/desorption stage.

In yet another preferred mode for carrying out the invention, the ozone storage system may further include an ozone discharging means for discharging ozone stored in the adsorption/desorption means upon occurrence of interruption of electric power supply to the system, and an ozone decomposing means for decomposing ozone molecules discharged from the adsorption/desorption means for thereby transforming the ozone gas into a gas containing no ozone.

The above and other objects, features and attendant effects and advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
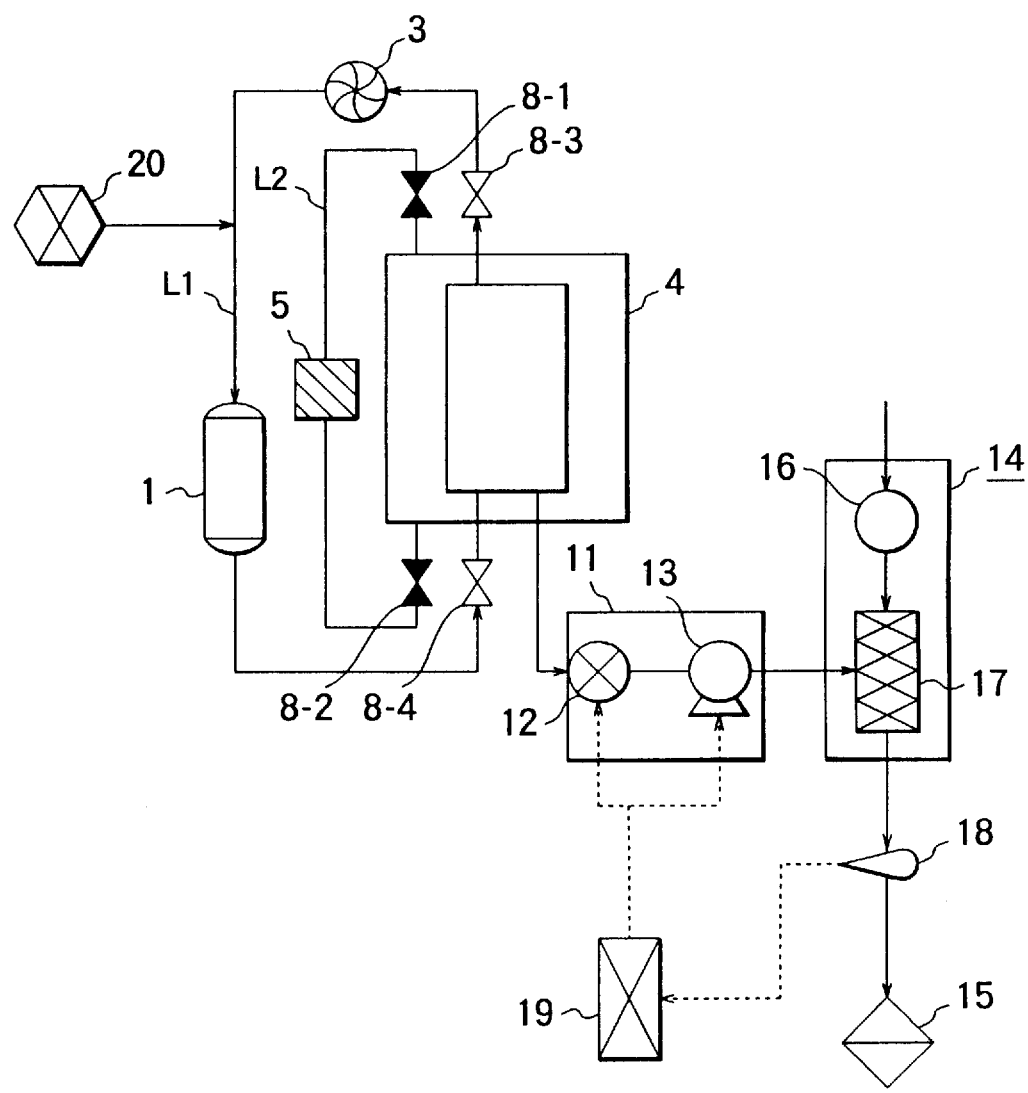
FIG. 1 is a schematic diagram showing generally a structure of an ozone storage system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "upstream", "downstream", and the like are words of convenience and are not to be construed as limiting terms.

Embodiment 1

Figure 28:
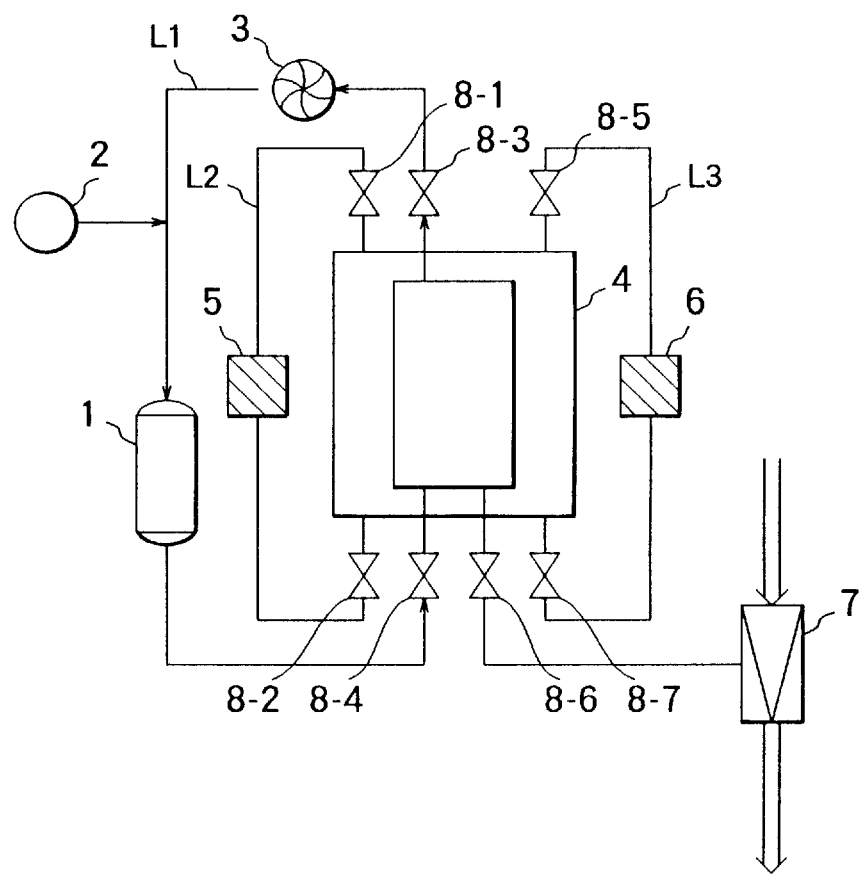
FIG. 28 is a schematic diagram showing generally a system configuration of the conventional intermittent ozone supply system.

Now, an ozone storage system according to a first embodiment of the present invention will be described by reference to FIG. 1 which is a schematic diagram showing generally a structure or configuration of the ozone storage system according to the first embodiment. In the figure, components same as or equivalent to those described hereinbefore by reference to FIG. 28 are designated by like reference characters. Repeated description of these components will be unnecessary. Referring to FIG. 1, there is provided an ozone discharging means 11 for taking out or drawing ozone from an adsorption/desorption tower 4 at a predetermined rate. To this end, the ozone discharging means 11 is composed of an ozone gas flow regulating unit 12 for controlling the amount or flow rate of ozone discharged from the adsorption/desorption tower 4, and a gas suction pump 13 for taking out ozone gas from the adsorption/desorption tower 4 by way of the ozone gas flow regulating unit 12.

Further provided in the ozone storage system is an ozone concentration controlling means 14 for controlling the supply of the ozone containing gas which contains ozone at a predetermined density or concentration to an ozone consumer 15. The ozone concentration controlling means 14 is constituted by a carrier gas generator 16 for producing a medium or carrier gas (also known as the vehicle gas) for carrying ozone molecules to the ozone consumer 15, and a gas mixing unit 17 for mixing together the carrier gas and ozone discharged from the adsorption/desorption tower 4 to thereby produce the ozone containing gas.

Additionally, the ozone storage system is further equipped with an ozone densimeter 18 (i.e., apparatus for measuring the concentration of ozone) for detecting the density or concentration of ozone contained in the ozone containing gas discharged from the gas mixing unit 17, a control unit 19 for generating a control signal on the basis of the signal outputted from the ozone densimeter 18 to thereby supply a control signal to the ozone gas flow regulating unit 12 and the gas suction pump 13, and a low-temperature processing unit 20 for producing oxygen as a raw material or substance (i.e., raw gas) for generating ozone by resorting to a low-temperature processing of air, wherein oxygen gas as produced by the low-temperature processing unit 20 is supplied to the ozone generator 1.

Next, description will turn to operation of the ozone storage system according to the first embodiment of the invention. Operation of the ozone storage system may be classified into two operation modes, i.e., ozone adsorbing operation mode and ozone desorbing operation mode.

Description will first be directed to the ozone adsorbing operation mode. Air supplied to the low-temperature processing unit 20 is liquidized, whereby liquid oxygen and liquid nitrogen are produced, being separated from each other. Liquid oxygen as produced is vaporized or evaporated again into oxygen gas, which is then supplied to the circulation system so that pressure prevailing therein is maintained constantly at a predetermined or given pressure level. In practical applications, the pressure within the circulation system is usually maintained at a level within a range from 1.5 to 2 $kg/cm^2$.

When oxygen gas is caused to flow through the ozone recirculation system by means of the circulating blower 3 in the state in which the change-over valves 8-3 and 8-4 are opened, a part of oxygen gas is transformed into ozone (i.e., ozonized) under the effect of a silent electric discharge when oxygen gas passes through an electric discharge gap defined between electrodes disposed within the ozone generator 1, whereby ozonized oxygen gas (i.e., oxygen gas containing ozone molecules) is produced to be subsequently transported to the adsorption/desorption tower 4. The adsorbent charged in the adsorption/desorption tower 4 adsorbs selectively ozone molecules from the ozonized oxygen gas, whereon residual oxygen gas is fed back toward the circulating blower 3 by way of the change-over valve 8-3.

An amount of oxygen consumed for the ozonization is supplemented to the circulation system by oxygen gasified from liquid oxygen produced by the low-temperature processing unit 20. At this juncture, it should be mentioned that the cooling temperature of the adsorbent is usually set at a value not higher than −40° C. by the coolant supplied from the coolant supply source 5 because the adsorbent has such a property that the ozone adsorbing capability of the adsorbent increases as the temperature thereof becomes lower. Incidentally, it is preferred to select as the adsorbent a material which is less susceptible to decomposition upon contact with ozone. As a preferred material to this end, a porous material impregnated with silica gel, activated alumina or fluorocarbon may be mentioned.

When ozone adsorption of the adsorbent charged in the adsorption/desorption tower 4 reaches a saturated adsorption level or state, operation of the ozone storage system is changed over to the ozone desorbing operation mode. In this case, operations of the ozone generator 1, the circulating blower 3 and the coolant supply source 5 are stopped with the change-over valves 8-1, 8-2, 8-3 and 8-4 being closed. Subsequently, the gas suction pump 13 is put into operation with the flow-path cross-sectional area of the ozone gas flow regulating unit 12 being increased gradually, to thereby allow ozone to be transferred to the gas mixing unit 17 from the adsorbent. At the same time, a carrier gas is supplied to the gas mixing unit 17 from the carrier gas generator 16, as a result of which ozone and the carrier gas are mixed together in the gas mixing unit 17, whereby ozone containing gas is produced to be subsequently supplied to the ozone consumer 15. Alternatively, the adsorption operation mode may be changed over to the desorption mode upon detection of leakage ozone of a preset concentration from the adsorption/desorption tower 4.

Next, description will be directed to an ozone desorbing process carried out through cooperation of the ozone discharging means 11 and the ozone concentration controlling means 14. The ozone concentration of the ozone containing gas discharged from the gas mixing unit 17 is measured by the ozone densimeter 18, the output signal of which is sent to the control unit 19. When the ozone concentration of the ozone containing gas as discharged is higher than the preset ozone concentration, a control signal is supplied to the ozone gas flow regulating unit 12 from the control unit 19, whereby the flow rate of the ozone containing gas is decreased or decremented a little bit by the ozone gas flow regulating unit 12 so that the actual ozone concentration conforms with the preset ozone concentration. At the same time, a control signal is supplied from the control unit 19 to the gas suction pump 13 as well to enfeeble the suction of ozone from the adsorption/desorption tower 4 to thereby reduce the amount of ozone discharged from the adsorption/desorption tower 4. Thus, the ozone concentration of the ozone containing gas is lowered to the preset ozone concentration level.

On the other hand, when the ozone concentration of the ozone containing gas is lower than the preset or predetermined (or desired) ozone concentration, a control signal is supplied to the ozone gas flow regulating unit 12 from the control unit 19, whereby the flow rate of the ozone containing gas is increased or incremented by the ozone gas flow regulating unit 12 so that the actual ozone concentration conforms with the preset or desired ozone concentration. At the same time, a control signal is also sent to the gas suction pump 13 from the control unit 19 to intensify the suction of ozone from the adsorption/desorption tower 4 for thereby increasing correspondingly the amount of ozone discharged from the adsorption/desorption tower 4. Consequently, the ozone concentration of the ozone containing gas is increased to the preset or desired ozone concentration level.

In that case, the control unit 19 supplies to the carrier gas generator 16 a control signal indicative of change in the flow of ozone gas fed to the gas mixing unit 17 to thereby control the flow rate of the ozone containing gas supplied to the ozone consumer 15 so that it conforms with the preset flow rate. In this way, the ozone containing gas containing ozone molecules at a predetermined concentration can be supplied constantly to the ozone consumer 15 at a predetermined flow rate. Additionally, energy consumed for storing ozone can be reduced while ensuring stable processing or treatment by using ozone in the ozone gas consumer.

The low-temperature processing unit 20 is very effective for preventing nitrogen from entering the circulation system because the low-temperature processing unit 20 is capable of producing liquidized oxygen used as the raw substance for generating ozone molecules. To say in another way, the purity of oxygen can be held at a high level. Additionally, because not nitrides (nitrogen oxides) are generated by the ozone generator 1, deposition of nitrides on the adsorbent can be prevented, whereby the adsorbent is protected against lowering of ozone adsorption efficiency or capability, which may otherwise be brought about by deposition of nitrides.

Next, description will be made of the ozone storing method according to the invention of the present invention. According to the teachings of the invention incarnated in this embodiment, ozone is adsorbed for storage thereof by lowering gradually the temperature prevailing within the adsorption/desorption tower 4 while maintaining the concentration of ozone discharged from the adsorption/desorption tower 4 after the adsorption constantly at a level lower than a preset concentration until the temperature within the adsorption/desorption tower 4 has attained a preset temperature.

Figure 2:
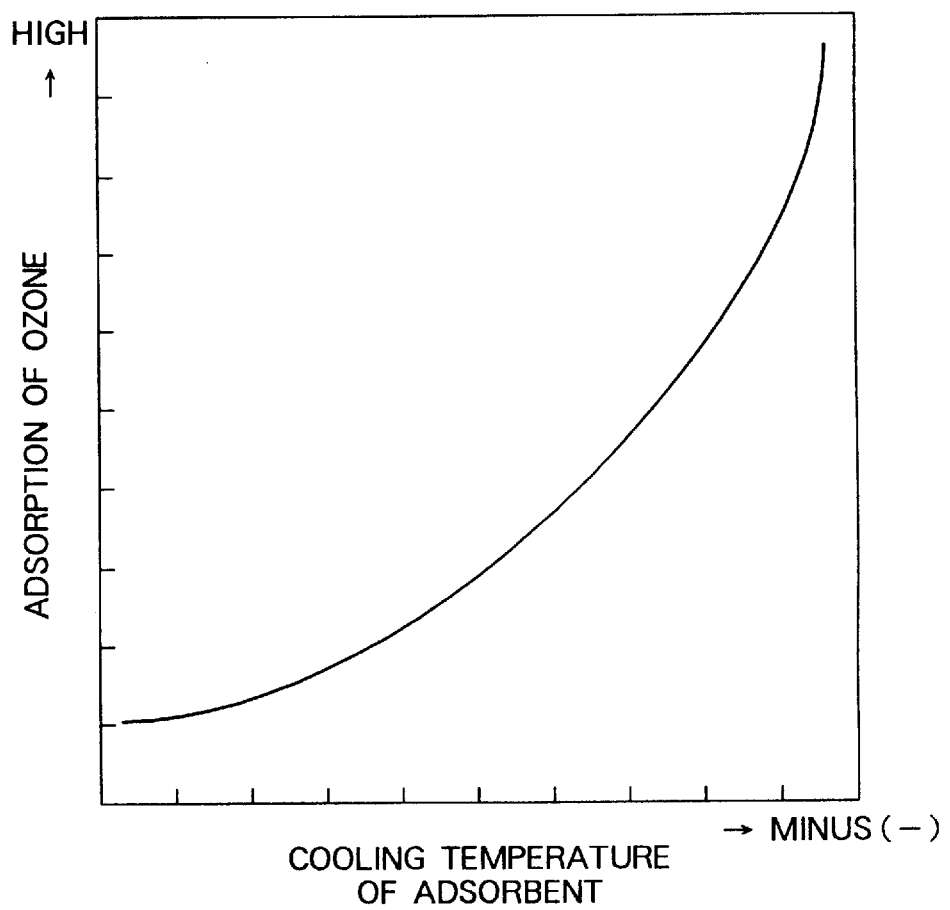
FIG. 2 is a view for graphically illustrating a relation between a cooling temperature of an adsorbent used in the system and adsorption rate of ozone.

FIG. 2 is a view for graphically illustrating a relation between an amount of ozone adsorption rate and a cooling temperature of the adsorbent (silica gel). As can be seen in this figure, the amount of adsorbed ozone increases exponentially as the cooling temperature of the adsorbent is lowered. It will thus be understood that what is important for storing ozone with high efficiency is to lower the temperature of the adsorbent as low as possible.

Figure 3:
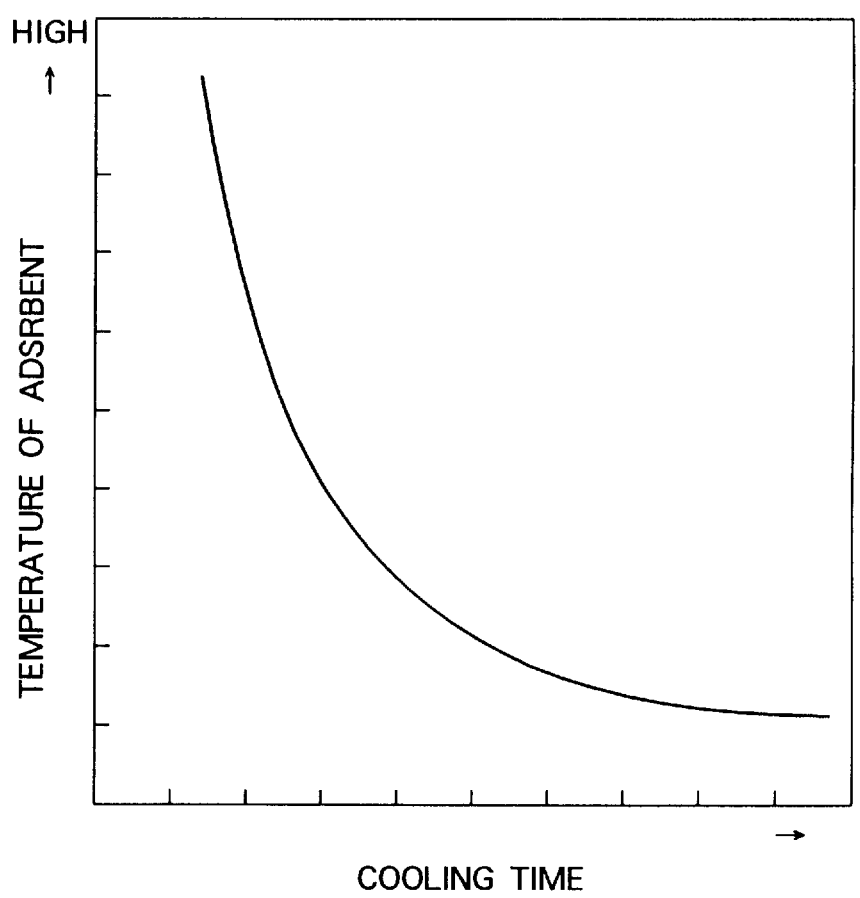
FIG. 3 is a view for graphically illustrating a relation between cooling time and temperature of an adsorbent.

In this conjunction, FIG. 3 shows graphically a relation between the temperature of the adsorbent and the cooling time. It can be seen from this figure that as the temperature of the adsorbent becomes lower, the time taken for further lowering the temperature of the adsorbent increases. Consequently, as the temperature of the adsorbent to be attained is lower, a cooler having a correspondingly increased cooling capability is required.

Figure 4:
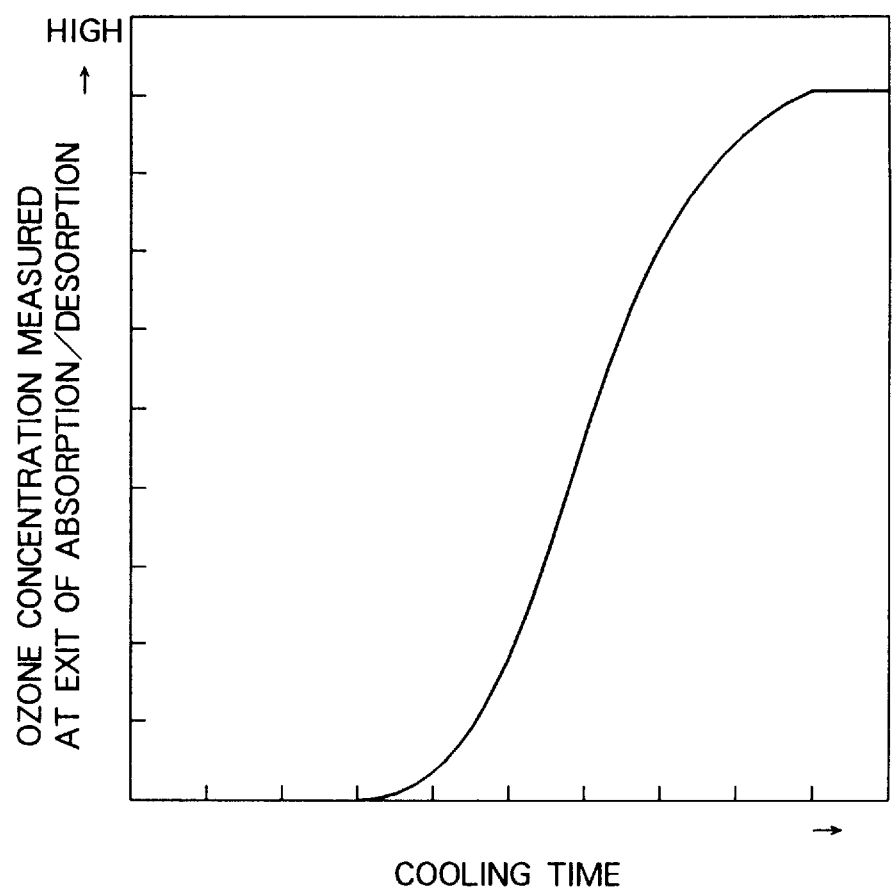
FIG. 4 is a view for illustrating a relation between adsorption time duration and ozone concentration measured at an exit side of an adsorption/desorption tower.

On the other hand, FIG. 4 shows an adsorption breakthrough curve (representing a relation between the ozone concentration measured at the outlet or exit of the adsorption/desorption tower 4 and a time taken for injection of ozone into the adsorption/desorption tower 4). It can be seen from this graph that when the time of ozone injection exceeds a certain temporal duration, ozone starts to leak from the adsorption/desorption tower 4 at a steeply increasing rate (i.e., adsorption breakthrough phenomenon takes place), providing difficulty for the efficient storage of ozone produced by the ozone generator 1. In this conjunction, when the concentration of ozone of the ozonized gas leaking from the adsorption/desorption tower 4 has attained a level corresponding to 5 to 10% of the concentration of ozone as injected, it is then decided that the temporal duration of ozone injection has reached the time for the adsorption breakthrough in the sense mentioned above.

For the reasons described above, it is taught according to the invention that the time taken for cooling the adsorbent to a certain temperature is determined to be shorter than the time duration for the ozone injection leading to the adsorption breakthrough at a given temperature. To say in another way, it is possible to store ozone produced with enhanced efficiency by cooling the adsorbent in such way that the adsorption breakthrough phenomenon is prevented from occurring before the given or preset temperature has been reached. Thus, it is unnecessary to provide the ozone storage system with a high-power rated cooler exhibiting a high cooling capacity. In other words, it is sufficient to equip the ozone storage system with a cooler having a cooling capacity capable of cooling the adsorbent charged in the adsorption/desorption tower 4 before the adsorption breakthrough occurs. Thus, the cost taken otherwise for the cooler can be reduced, to an advantage.

In the case of the ozone storage system of the structure described above, ozonized oxygen gas is introduced into the adsorption/desorption tower 4 from the floor side thereof in the ozone adsorption operation. Similarly, in the ozone desorption operation mode, ozone is discharged from the adsorption/desorption tower 4 at the floor thereof. However, except for the case where the adsorbent charged in the adsorption/desorption tower 4 is in a perfectly equilibrium state, it is desirable to dispose the inlet for feeding the ozonized oxygen gas in the ozone adsorption operation mode and the outlet for taking out ozone in the ozone desorption operation mode at respective positions which are symmetrical to the center of the adsorption/desorption tower 4, e.g. a position corresponding to a ceiling or top portion of the adsorption/desorption tower 4 and a position corresponding to a floor or bottom portion thereof, respectively. This is because ozone adsorption ratio of the adsorbent becomes lower as the distance from the inlet for the ozone containing gas although ozone is adsorbed to a sufficient extent by the adsorbent located in the vicinity of the inlet through which the ozonized oxygen gas is introduced. Accordingly, it is preferred in the ozone desorption operation mode to take out initially ozone desorbed from the adsorbent located remote from the inlet for the ozonized oxygen gas because then the amount of ozone discharged from the adsorption/desorption tower 4 in the initial phase of the ozone desorption operation mode can be reduced, whereby the amount of ozone taken out from the adsorption/desorption tower 4 can be prevented from increasing steeply or abruptly at the start of the ozone desorption operation mode.

In the ozone storage system according to the instant embodiment of the invention, the ozone concentration of the ozone containing gas discharged from the gas mixing unit 17 is measured so as to control the supply of the ozone containing gas which contains ozone at a predetermined ozone concentration to the ozone consumer 15 by the control unit 19 such that the ozone containing gas can be supplied to the ozone consumer 15 constantly at a predetermined rate. However, the invention is never limited to the above arrangement. By way of example, operations of the ozone gas flow regulating unit 12, the gas suction pump 13 and the carrier gas generator 16 may be controlled by using a timer (not shown) so that the ozone containing gas containing ozone at a predetermined ozone concentration can be supplied constantly to the ozone consumer 15 steadily at a predetermined constant rate. In this case, the ozone concentration control accuracy of the ozone containing gas may be degraded more or less. However, the mechanical structure of the ozone storage system can be simplified with the cost for the equipment being reduced, to a profitable effect.

In the ozone storage system described above, it has been assumed that the single adsorption/desorption tower 4 is employed. However, it is desirable to provide the ozone storage system with a plurality of adsorption/desorption towers 4 in such arrangement that when the ozone desorption rate in a given one of the plural adsorption/desorption towers 4 becomes low, the ozone gas flow regulating unit 12 provided in association with another adsorption/desorption tower 4 is put into operation. In that case, ozone flows discharged from a plurality of adsorption/desorption towers 4 are mixed together to be subsequently supplied to the gas mixing unit 17, whereby the ozone containing gas which contains ozone at a predetermined constant concentration can easily be supplied to the ozone consumer 15 continuously at a predetermined constant rate.

In the ozone storage system of the structure described above, the adsorption/desorption tower 4 is equipped with only the coolant supply source 5 (cold source), wherein operation of the coolant supply source 5 is stopped in the ozone desorption operation mode in order to facilitate desorption of ozone. However, as a modification, the adsorption/desorption tower 4 may be provided not only with the coolant supply source 5 but also a heating source for controlling the temperature of the adsorption/desorption tower 4 for the purpose of facilitating the desorption of ozone in the adsorption/desorption tower 4. With such arrangement, the amount of ozone taken out from the adsorption/desorption tower 4 and supplied to the ozone consumer 15 can be controlled with higher accuracy.

Furthermore, in the ozone storage system described above, ozone taken out from the adsorption/desorption tower 4 is mixed with a medium or carrier gas after passing through the ozone gas flow regulating unit 12 and the gas suction pump 13 to be subsequently supplied to the ozone consumer 15. However, such arrangement is also conceivable that a buffer unit is disposed between the adsorption/desorption tower 4 and the ozone gas flow regulating unit 12 so that ozone delivered from the adsorption/desorption tower 4 is once held temporarily in the buffer to thereby prevent ozone from being discharged in an excessively large amount in the initial phase of the ozone desorption operation mode. By virtue of such arrangement, the rate at which ozone is discharged from the adsorption/desorption tower 4 (or amount of ozone discharged from the adsorption/desorption tower 4) can be controlled with high accuracy, which in turn means that the concentration of ozone contained in the ozone containing gas fed to the ozone consumer 15 can be controlled with correspondingly enhanced accuracy, to an advantageous effect. In this case, the buffer unit may be constituted by a tower or column filled with adsorbent such as silica gel or alternatively by a container or tank of a predetermined volume for containing ozone therein.

Embodiment 2

In the ozone storage system according to the first embodiment of the invention, ozone desorbed from the adsorbent under the suction of the gas suction pump 13 constituting a part of the ozone discharging means 11 is mixed with the carrier gas produced by the carrier gas generator 16 constituting a part of the ozone concentration controlling means 14 to generate the ozone containing gas, wherein ozone is supplied to the ozone consumer 15 constantly at a predetermined flow rate.

Figure 5:
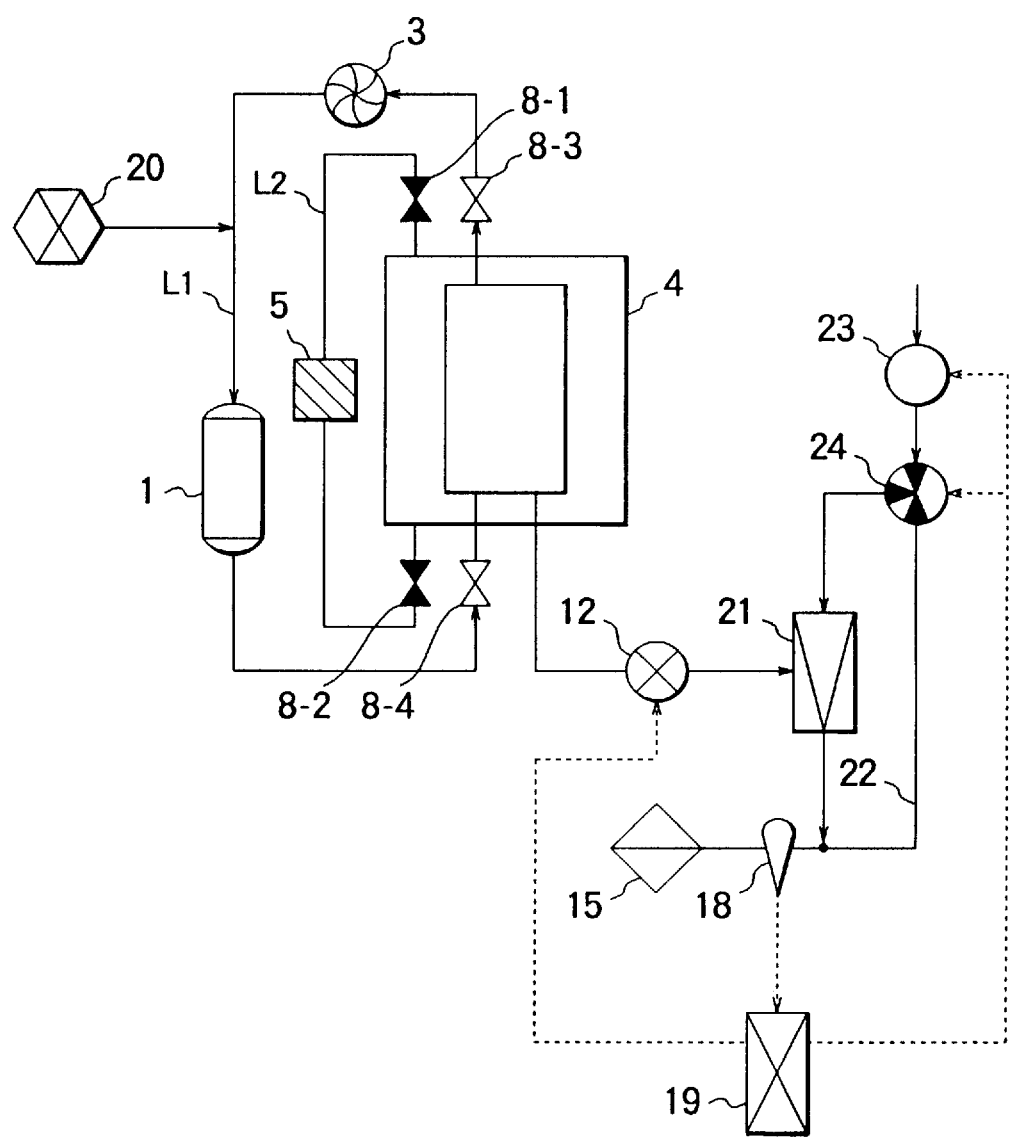
FIG. 5 is a schematic diagram showing generally a structure of an ozone storage system according to a second embodiment of the present invention.

By contrast, the ozone storage system according to a second embodiment of the present invention is comprised of an ozone gas flow regulating unit 12 designed for controlling the flow rate of ozone delivered from the adsorption/desorption tower 4, a gas ejector 21 for depressurizing the interior of the adsorption/desorption tower 4 to thereby allow ozone to be desorbed and discharged from the adsorption/desorption tower 4 by way of the ozone gas flow regulating unit 12, a bypass pipe 22 disposed in parallel with the gas ejector 21 for interconnecting an inlet and an outlet of the gas ejector 21, a compressed gas generator 23 for producing a compressed carrier gas for driving the gas ejector 21, a two-way flow regulating valve 24 for regulating a flow ratio between the compressed carrier gas supplied to the gas ejector 21 and the compressed carrier gas supplied to the bypass pipe 22 from the compressed gas generator 23, an ozone densimeter 18 designed for measuring the concentration of ozone contained in the ozone containing gas produced by the gas ejector 21, and a control unit 19 for generating control signals supplied to the ozone gas flow regulating unit 12, the compressed gas generator 23 and the two-way flow regulating valve 24, respectively, on the basis of the signal indicating concentration of ozone contained in the ozone containing gas as measured by the ozone densimeter 18, as shown in FIG. 5. In the ozone storage system according to the second embodiment of the invention, the gas suction pump 13 mentioned hereinbefore in conjunction with the first embodiment can be spared.

Now, description will turn to operation of the ozone storage system according to the second embodiment of the invention.

The ozone concentration of the ozone containing gas discharged from the gas ejector 21 is measured by the ozone densimeter 18, the output signal of which is sent to the control unit 19. When the ozone concentration of the ozone containing gas is higher than the preset ozone concentration, a control signal is supplied to the ozone gas flow regulating unit 12 from the control unit 19, whereby the flow rate of the ozone containing gas is decremented by the ozone gas flow regulating unit 12. At the same time, a control signal is supplied to the two-way flow regulating valve 24 from the control unit 19.

As a result of this, a corresponding part of the compressed carrier gas is caused to flow through the bypass pipe 22, bypassing the gas ejector 21. Consequently, the flow rate of the compressed carrier gas supplied to the gas ejector 21 decreases, and the speed at which the compressed carrier gas flows through the nozzle of the gas ejector 21 becomes low. Thus, the pressure prevailing within the adsorption/desorption tower 4 increases with the ozone desorption rate being reduced. In this way, the ozone concentration of the ozone containing gas ejected from the gas ejector 21 can be lowered.

On the other hand, when the ozone concentration of the ozone containing gas ejected from the gas ejector 21 is lower than the preset ozone concentration, a control signal is supplied to the ozone gas flow regulating unit 12 from the control unit 19, as a result of which the flow-path cross-sectional area of the ozone gas flow regulating valve 12 is opened a little. At the same time, a control signal is sent to the two-way flow regulating valve 24 as well from the control unit 19, whereby the flow rate of the ozone containing gas supplied to the gas ejector 21 is incremented correspondingly.

Owing to the control of the valves 12 and 24 mentioned above, the speed at which the compressed carrier gas flows through the nozzle incorporated in the gas ejector 21 increases to thereby lower the pressure within the adsorption/desorption tower 4, as a result of which the amount of ozone discharged from the adsorption/desorption tower 4 increases with the ozone concentration of the ozone containing gas becoming hither. In that case, the control unit 19 sends to the compressed gas generator 23 a control signal indicative of change in the flow rate of the ozone containing gas flowing through the gas ejector 21 to thereby control the flow rate of the compressed carrier gas so that the ozone containing gas supplied to the flow rate of the ozone consumer 15 conforms with the preset flow rate.

With the arrangement of the ozone storage system described above, the gas mixing unit 17 and the gas suction pump 13 employed in the ozone storage system according to the first embodiment of the invention are replaced by the gas ejector 21. Thus, the structure of the ozone storage system according to the instant embodiment can be simplified while allowing energy required for effectuating the ozone desorption operation mode to be reduced. Besides, the ozone adsorption/desorption column or tower can be realized in a compact size.

In the ozone storage system according to the second embodiment of the invention, ozone concentration of the ozone containing gas ejected from the gas ejector 21 is measured. On the basis of the result of the measurement, the control unit 19 performs such control that the ozone containing gas which contains ozone at a predetermined concentration can be supplied constantly to the ozone consumer 15 at a predetermined flow rate. However, the ozone storage system according to the instant embodiment may be so modified that instead of using the control unit 19, operations of the ozone gas flow regulating unit 12, the compressed gas generator 23 and the two-way flow regulating valve 24 are controlled by a timer (not shown) such that the ozone containing gas which contains ozone at a predetermined concentration can be supplied constantly to the ozone consumer 15 at a predetermined flow rate. In that case, accuracy for the control of ozone concentration of the ozone containing gas may be deteriorated to a small extent. However, the system structure can be simplified with the cost of equipment being decreased.

In the structure of the ozone storage system described above, the ratio of the flow rates of the compressed carrier gas flowing through the gas ejector 21 and the bypass pipe 22 is adjusted by using the two-way flow regulating valve 24. It should however be mentioned that similar ozone concentration control effect can be achieved by providing compressed gas flow control devices in a pipe in which the gas ejector 21 is installed and the bypass pipe 22, respectively, to thereby control the flow rates of the compressed gas flowing through both the pipes by the associated control devices, respectively, while maintaining the flow rate of the ozone containing gas supplied to the ozone consumer 15 to be constant, even though the cost of equipment increases more or less in that case.

Embodiment 3

In the ozone storage system according to the second embodiment of the present invention, flow of the compressed carrier gas produced by the compressed gas generator 23 is controlled by using the two-way flow regulating valve 24 with a view to adjusting the ozone concentration of the ozone containing gas by regulating the flow rate of the compressed carrier gas in the gas ejector 21 or the bypass pipe 22.

Figure 6:
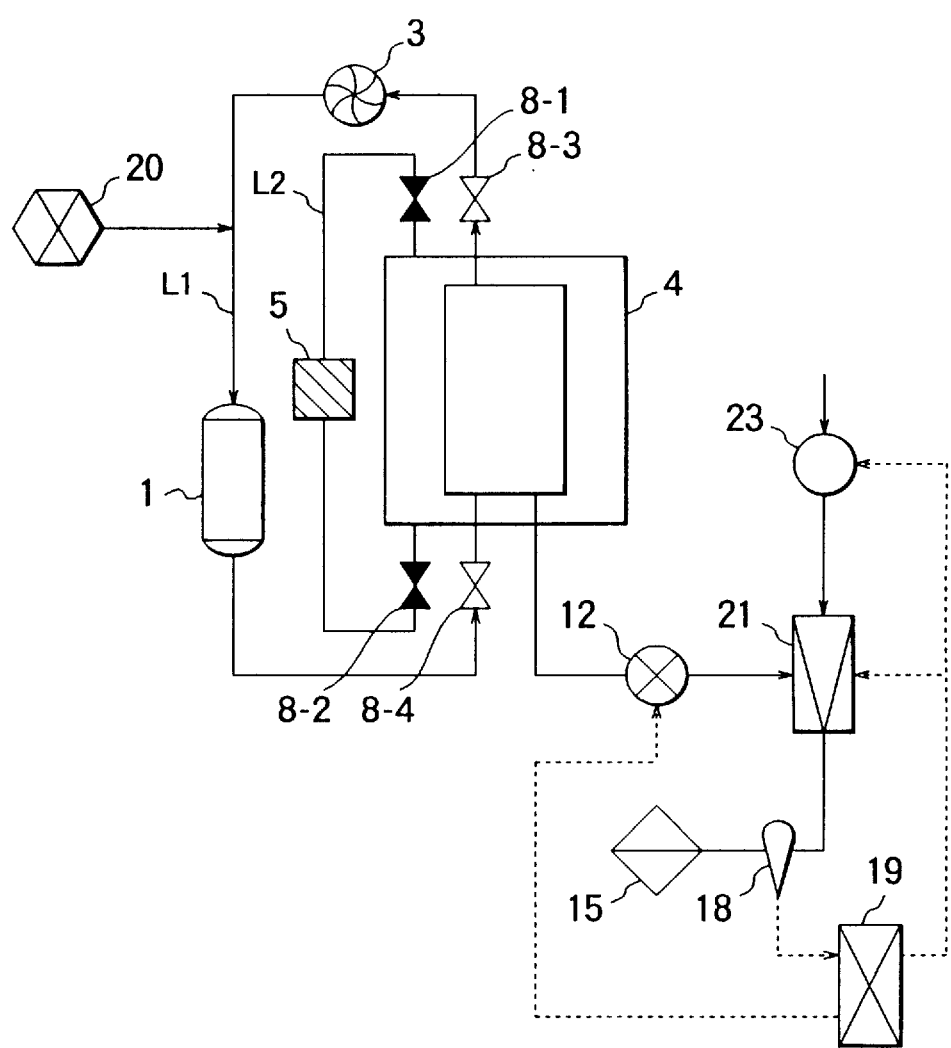
FIG. 6 is a schematic diagram showing generally a structure of an ozone storage system according to a third embodiment of the present invention.

In the ozone storage system according to a third embodiment of the invention, there is provided in combination with the ozone densimeter 18 designated to measure the ozone concentration of the ozone containing gas produced by the gas ejector 21 and the ozone gas flow regulating unit 12 for adjusting the flow rate of ozone taken out from the adsorption/desorption tower 4 under depressurization a control unit 19 which is so designed as to control the diameter of a nozzle incorporated in the gas ejector 21 in dependence on the output signal of the ozone densimeter 18, as shown in FIG. 6. By virtue of this arrangement, the bypass pipe 22 and the two-way flow regulating valve 24 can be suppressed.

Operation of the ozone storage system according to the third embodiment of the invention will now be described.

The ozone concentration of the ozone containing gas ejected from the gas ejector 21 is first measured by the ozone densimeter 18, the output signal of which is sent to the control unit 19. When the ozone concentration of the ozone containing gas is higher than a preset ozone concentration, a control signal is supplied to the ozone gas flow regulating unit 12 and the gas ejector 21 from the control unit 19, whereby the flow rate of the ozone containing gas is decremented by the ozone gas flow regulating unit 12. At the same time, the diameter of the nozzle incorporated in the gas ejector 21 is increased, as a result of which the flow rate of the compressed gas flowing through the nozzle of the gas ejector 21 is decreased. Consequently, the amount of ozone discharged from the adsorption/desorption tower 4 is decreased because of increase in the pressure within the adsorption/desorption tower 4. Thus, the amount of ozone as taken out can be lowered to a preset or desired level.

On the other hand, when the ozone concentration of the ozone containing gas is lower than the preset ozone concentration, the control unit 19 supplies a control signal to both the ozone gas flow regulating unit 12 and the gas ejector 21, whereby the valve of the ozone gas flow regulating unit 12 is opened by a small degree and at the same time, the nozzle diameter of the gas ejector 21 is decreased to thereby increase the flow rate of the compressed gas flowing through the nozzle while lowering the pressure within the adsorption/desorption tower 4. Consequently, the ozone concentration of the ozone containing gas is increased because of increase in the amount of ozone discharged from the adsorption/desorption tower 4.

In that case, the control unit 19 supplies to the compressed gas generator 23 a control signal indicative of change in the flow of ozonized oxygen gas fed to the gas ejector 21 to thereby control the flow rate of the ozone containing gas supplied to the ozone consumer 15 so that it coincides with the preset flow rate.

With the arrangement of the ozone storage system described above, the bypass pipe 22 and the two-way flow regulating valve 24 can be spared. Thus, the structure of the ozone storage system according to the instant embodiment can be simplified as a whole with the number of the components required for the ozone storage system being decreased.

In the ozone storage system according to the third embodiment of the invention described above, ozone concentration of the ozone containing gas ejected from the gas ejector 21 is measured, and on the basis of the result of the measurement, the control unit 19 performs such control that the ozone containing gas which contains ozone at a predetermined concentration can be supplied constantly to the ozone consumer 15 at a predetermined or desired flow rate. However, the ozone storage system according to the instant embodiment may be so modified that operations of the ozone gas flow regulating unit 12, the gas ejector 21 and the compressed gas generator 23 are controlled by a timer (not shown) such that the ozone containing gas containing ozone at a predetermined concentration can be supplied constantly to the ozone consumer 15 at a predetermined flow rate. In that case, accuracy for controlling the ozone concentration of the ozone containing gas will be deteriorated to a small extent. However, the system structure can be simplified with the cost of equipment being decreased.

Embodiment 4

In the case of the ozone storage systems described above, no consideration is paid to the effective utilization of the cold emitted from liquid oxygen and liquid nitrogen produced by the low-temperature processing unit 20. The invention incarnated in a fourth embodiment thereof is directed to utilization of the cold mentioned above for cooling of the ozone generator 1.

Figure 7:
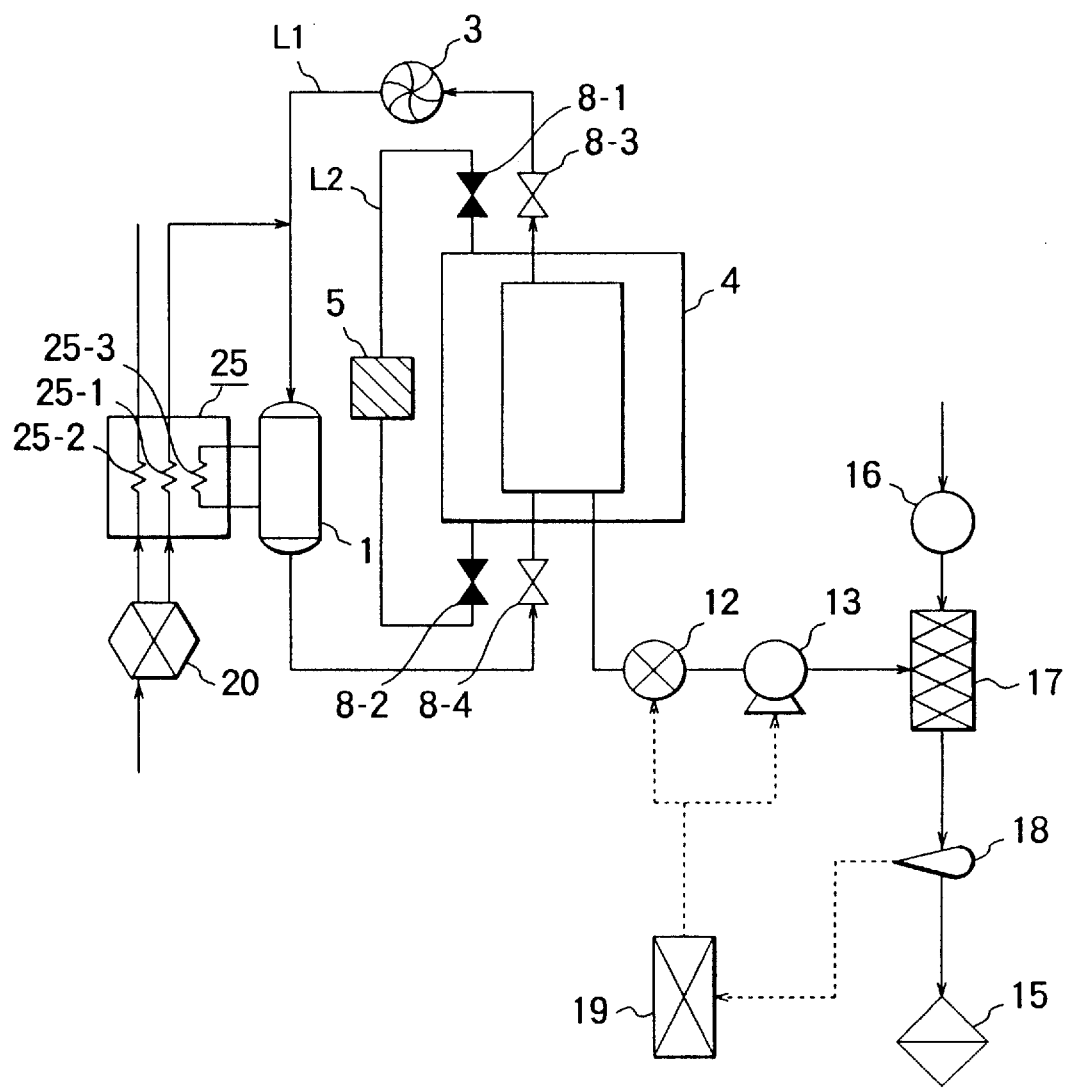
FIG. 7 is a schematic diagram showing generally a structure of an ozone storage system according to a fourth embodiment of the present invention.

FIG. 7 is a schematic diagram showing generally a structure of an ozone storage system according to the fourth embodiment of the invention. In the figure, components same as or equivalent to those shown in FIG. 1 are designated by like reference characters. Referring to FIG. 7, reference numeral 25 denotes a gas cooler system designed for extracting latent heat of evaporation from liquid oxygen or liquid nitrogen. The gas cooler system 25 is comprised of a gas cooler 25-1 for evaporating liquid oxygen produced by the low-temperature processing unit 20 to thereby feed the oxygen gas to the circulating pipe L1, a gas cooler 25-2 for evaporating liquid nitrogen produced by the low-temperature processing unit 20 to thereby feed a nitrogen gas as the compressed carrier gas, and a cooler 25-3 for cooling the ozone generator 1 by utilizing the cold emitted from liquid oxygen and liquid nitrogen.

Next, description will be made of operation of the ozone storage system according to the instant embodiment of the invention. The ozone storage system has two operation modes, i.e., ozone adsorbing operation mode and ozone desorbing operation mode. Since the ozone desorbing operation is same as that described hereinbefore in conjunction with the first embodiment, repeated description thereof will be unnecessary.

In the ozone adsorbing operation, air is supplied to the low-temperature processing unit 20 to be thereby liquidized, whereby liquid oxygen and liquid nitrogen are produced. Liquid oxygen as produced is vaporized by the gas cooler 25-1 into the oxygen gas, which is supplied to the circulation system (L1, 3, 4) so that the pressure prevailing therein is maintained constantly at a predetermined or desired pressure level. In practical applications, the pressure within the circulation system is usually maintained at a level within a range from 1.5 to 2 kg/cm$^2$.

On the other hand, liquid nitrogen produced simultaneously with liquid oxygen is evaporated by the gas cooler 25-2 to be stored as the compressed carrier gas to be used in the ozone desorption operation mode of the ozone storage system. The cooler 25-3 is designed to serve for cooling the electric discharge portion of the ozone generator 1 by making use of the cold emitted from liquid oxygen and liquid nitrogen. Thus, the heat transfer medium of the ozone generator 1 is refrigerated to enhance the efficiency at which ozone is produced. Moreover, ozone can be produced more stably by the ozone generator 1. Parenthetically, as the heat transfer medium for cooling the electric discharge portion of the ozone generator 1, there may be mentioned anti-freeze liquid such as water, brine, ethylene glycol or the like.

When oxygen gas supplied to the circulation system is forced to flow therethrough by the circulating blower 3 in the state in which the change-over valves 8-3 and 8-4 are opened, a part of oxygen gas is transformed into ozone (i.e., ozonized) under the effect of the silent electric discharge when oxygen gas passes through the electric discharge gap defined between electrodes disposed within the ozone generator 1, whereby ozonized oxygen gas (i.e., oxygen gas containing ozone molecules) as produced is subsequently transported to the adsorption/desorption tower 4.

The adsorbent charged in the adsorption/desorption tower 4 adsorbs selectively ozone molecules from the ozonized oxygen gas, and the residual oxygen gas is fed back to the circulation system toward the circulating blower 3 by way of the change-over valve 8-3. An amount of oxygen consumed for the ozonization is supplemented to the circulation system by oxygen gas resulting from evaporation in the gas cooler 25-1 from liquid oxygen produced by the low-temperature processing unit 20. In that case, the cooling temperature is usually set at a value not higher than $-40°$ C. by the coolant supply source 5 because the adsorbent has such a nature that the ozone adsorbing capability of the adsorbent increases as the temperature thereof is low. Incidentally, it is preferred to select as the adsorbent a material which is less susceptible to decomposition upon contact with ozone. As a preferred material to this end, a porous material impregnated with silica gel, activated alumina or fluorocarbon may be mentioned.

With the arrangement described above, power consumption involved in cooling the electric discharge portion of the ozone generator 1 can be lowered, which requires less electric energy or power in the ozone adsorption operation mode when compared with the conventional system can be realized.

Figure 8:
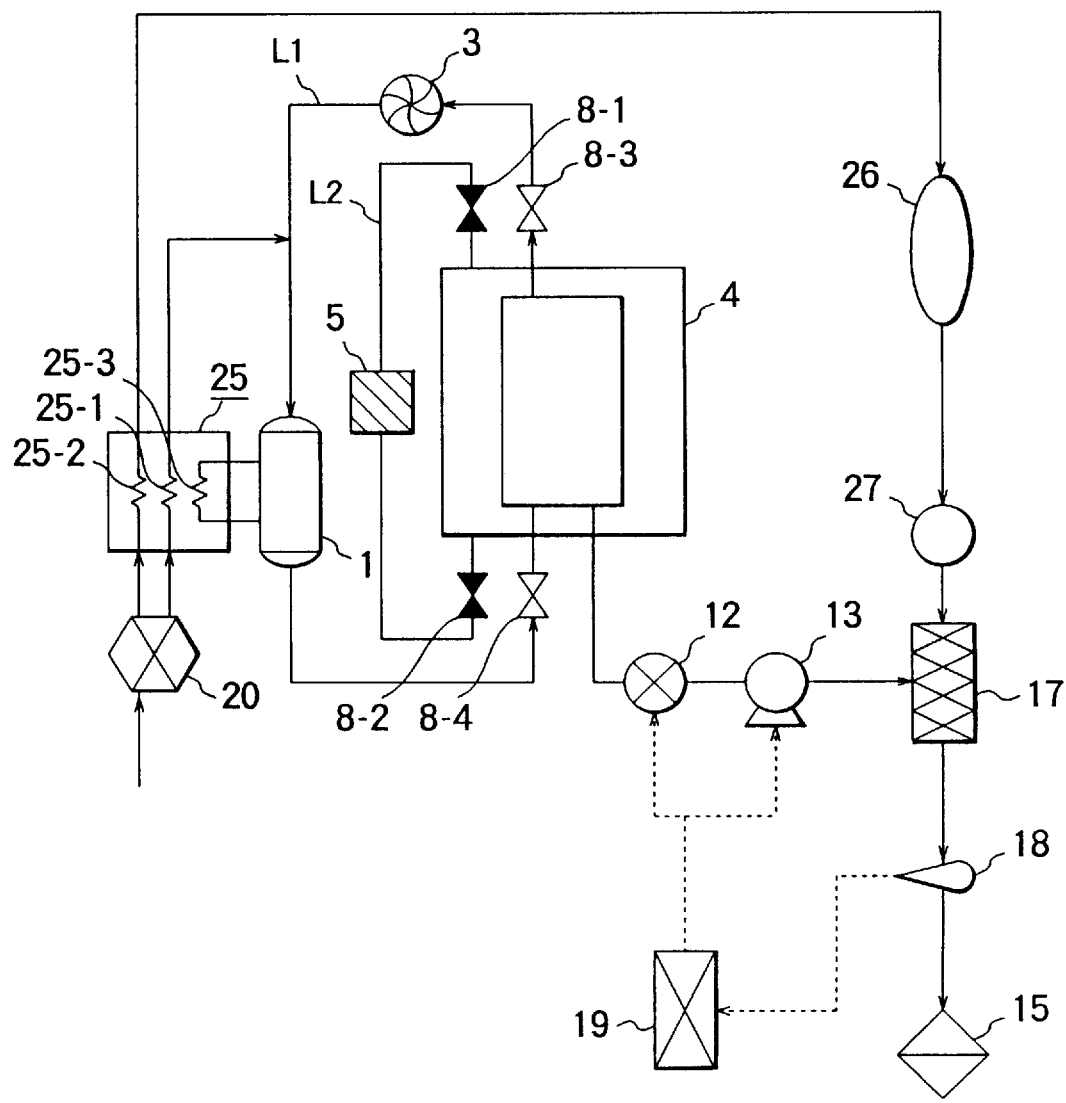
FIG. 8 is a schematic diagram showing generally a structure of a modified ozone storage system according to the fourth embodiment of the present invention.
Figure 9:
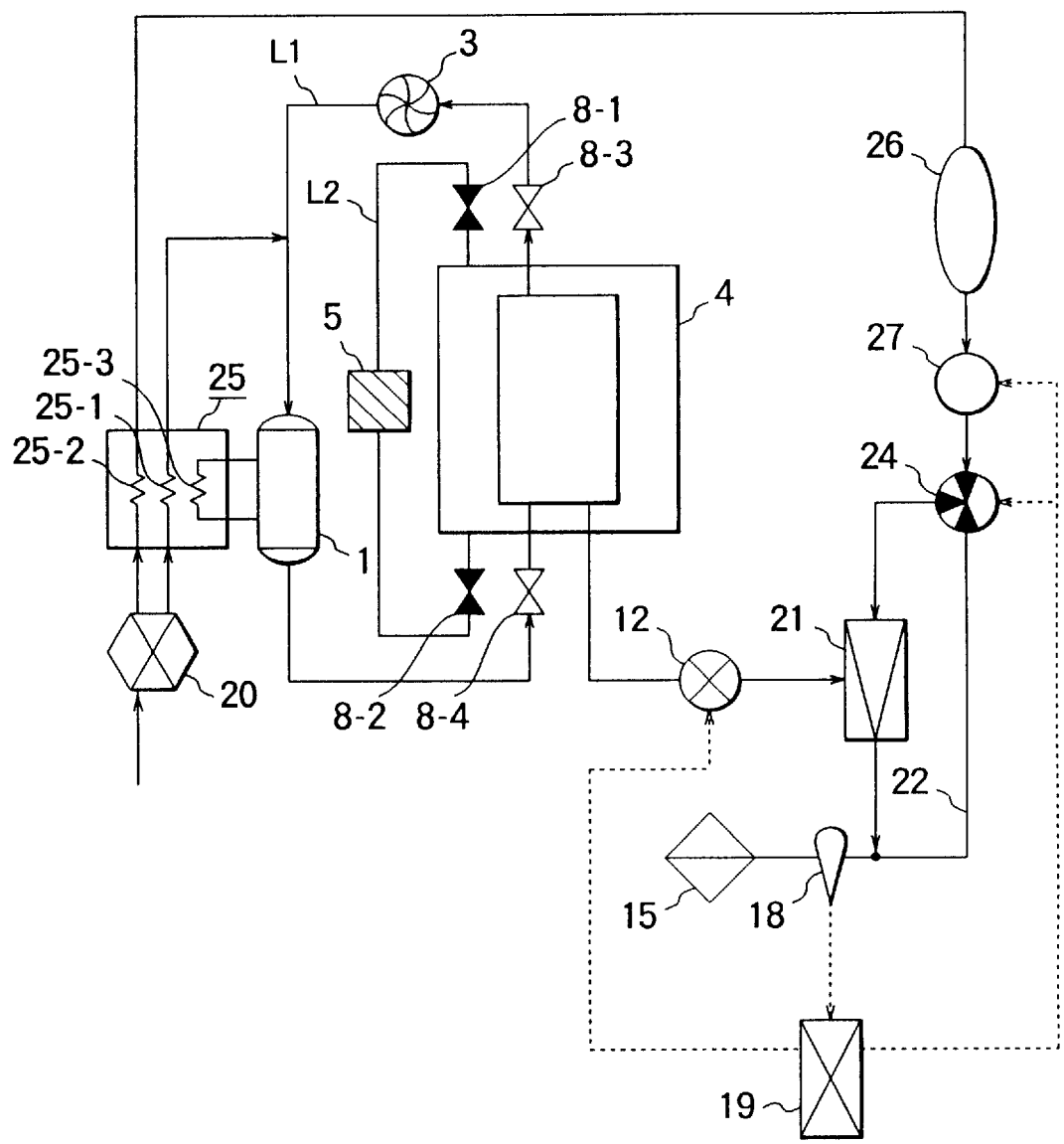
FIG. 9 is a schematic diagram showing generally a structure of another modification of the ozone storage system according to the fourth embodiment of the present invention.

Further, the oxygen gas produced by evaporation by the gas cooler 25-1 can be used as a raw material or gas for producing ozonized oxygen gas, while nitrogen produced by evaporation by the gas cooler 25-2 can be temporarily stored in a gas reservoir 26 under pressurization until the ozone desorption operation mode is started, as can be seen from FIG. 8 or FIG. 9. Nitrogen stored under pressurization can be used as the carrier gas for transporting ozone to the ozone consumer 15 by way of a gas flow meter 27, as illustrated in FIG. 8, or as the compressed carrier gas for driving the gas ejector 21 by way of the gas flow meter 27, as illustrated in FIG. 9. In this way, liquid nitrogen produced by the low-temperature processing unit 20 can be utilized effectively.

By virtue of the arrangement described above, electric energy or power required for producing the carrier gas or compressed carrier gas used in the ozone desorption operation mode can be reduced with the carrier gas generator 16 or the compressed gas generator 23 being spared, allowing the cost of equipment to be reduced.

Embodiment 5

Figure 10:
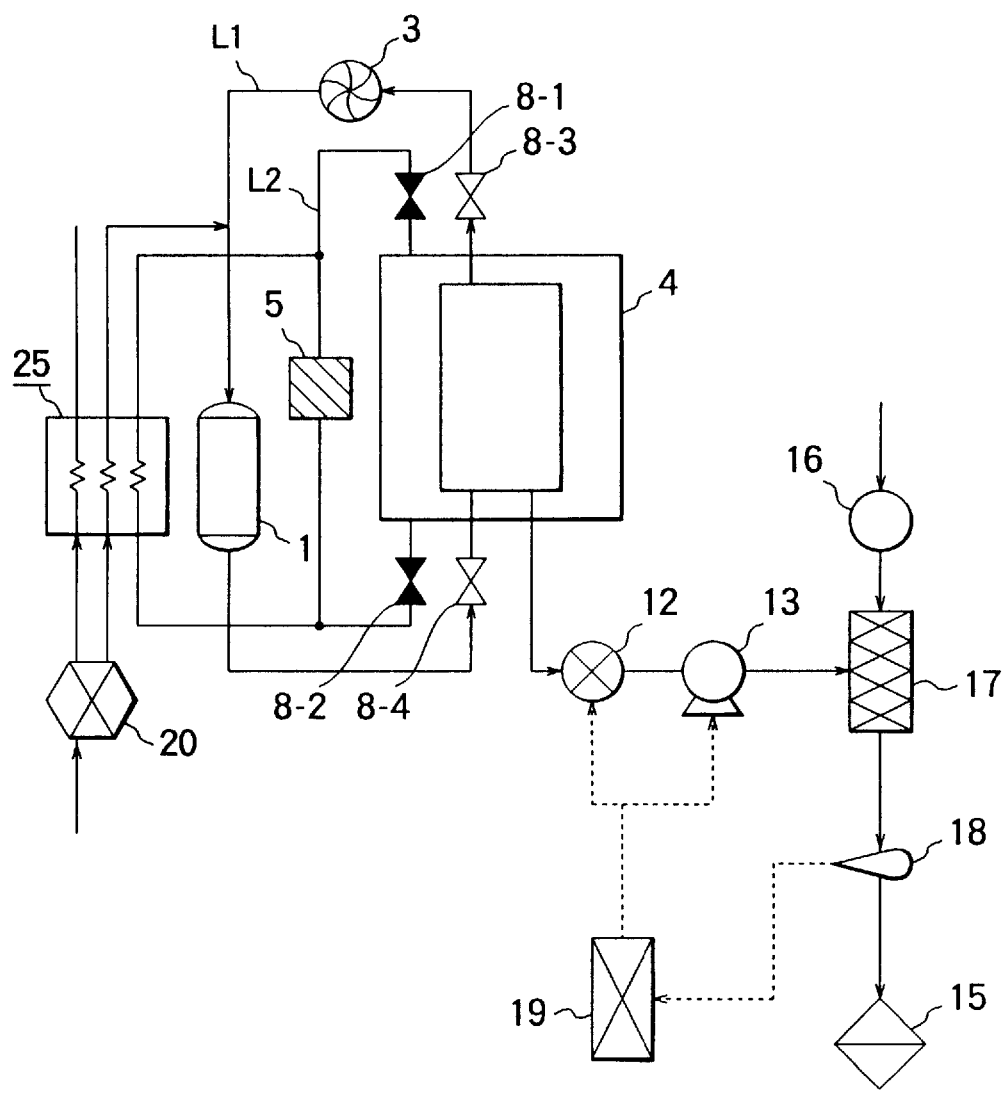
FIG. 10 is a schematic diagram showing generally a structure of an ozone storage system according to a fifth embodiment of the present invention.

In the ozone storage system according to the fourth embodiment of the invention, liquid oxygen and liquid nitrogen produced by the low-temperature processing unit 20 are evaporated by the gas cooler system 25, wherein the cold emitted from liquid oxygen in the gas cooler system 25 is made use of for cooling the heat transfer medium which is destined for cooling the electric discharge portion of the ozone generator 1. However, energy required for cooling the adsorption/desorption tower 4 can be reduced as well by adopting such arrangement that the cold emitted from liquid oxygen and liquid nitrogen upon evaporation thereof in the gas cooler system 25 is utilized as a part of the cold required for cooling the adsorption/desorption tower 4, as shown in FIG. 10. Additionally, power consumption of the coolant supply source 5 can also be reduced in the ozone adsorption operation mode.

Furthermore, even when emergency stop takes place in the operation of the refrigerator constituting the coolant supply source 5 in the ozone adsorption operation mode, such situation can be evaded in which the temperature of the adsorption/desorption tower 4 rises up rapidly for promoting ozone desorption to thereby increase the ozone concentration within the adsorption/desorption tower 4 to an excessively high level which makes it difficult or impossible to operate normally the adsorption/desorption tower 4. According to the invention incarnated in the fifth embodiment, ozone can be stored with high security or safety.

Embodiment 6

Figure 11:
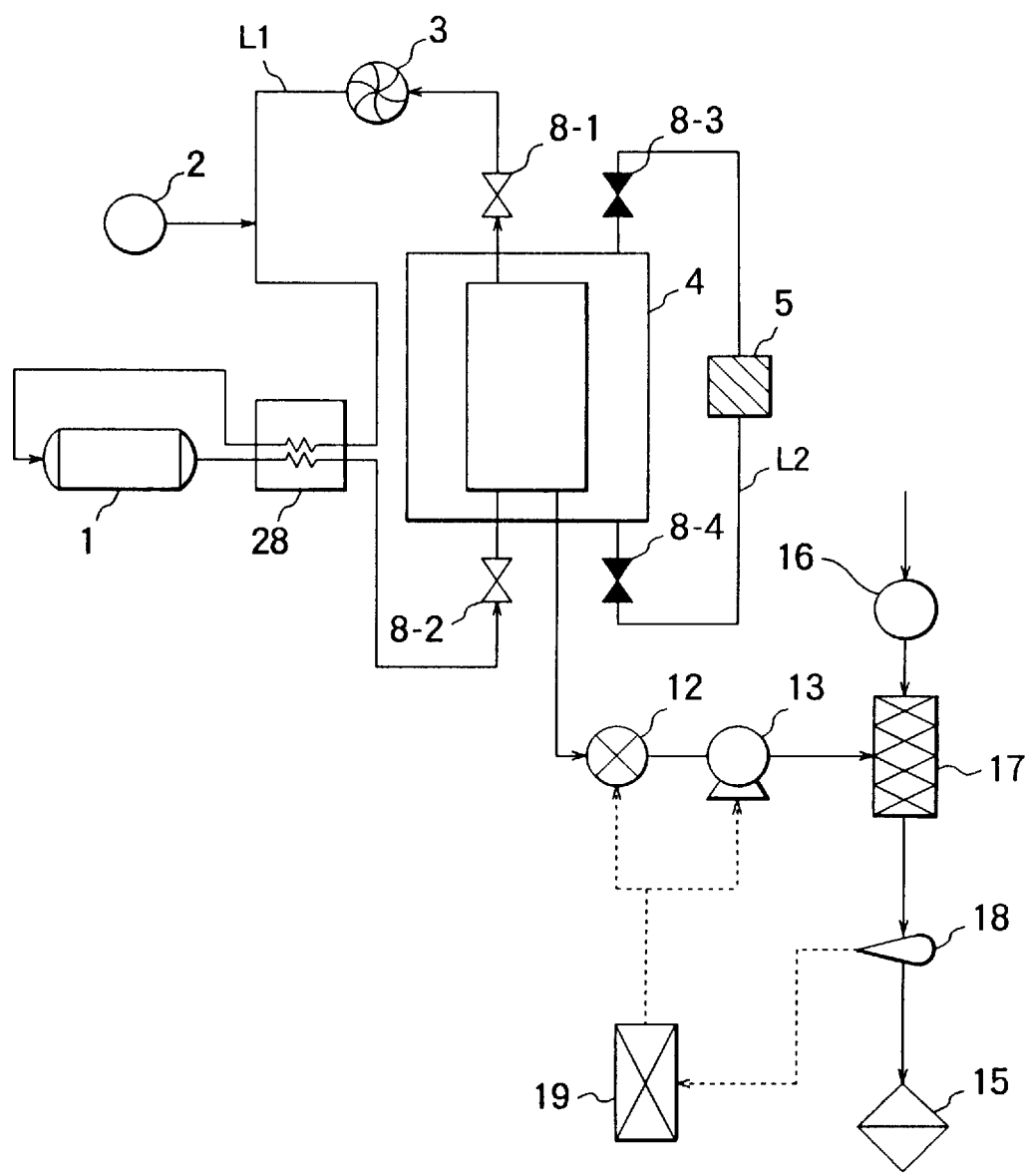
FIG. 11 is a schematic diagram showing generally a structure of an ozone storage system according to a sixth embodiment of the present invention.

In each of the ozone storage system described above, the coolant supply source 5 is provided for cooling the adsorption/desorption tower 4. By contrast, in the case of the ozone storage system according to a sixth embodiment of the invention, there is provided a heat exchanger for transferring heat carried by the ozonized oxygen gas flow discharged from the ozone generator 1 to the oxygen containing gas discharged from the adsorption/desorption tower 4, as shown in FIG. 11.

Operation of the ozone storage system according to the instant embodiment of the invention will be described. The ozone storage system has two operation modes, i.e., ozone adsorbing operation mode and ozone desorbing operation mode. Since the ozone desorbing operation is essentially same as that described hereinbefore in conjunction with the first embodiment, repeated description is omitted. The following description will thus be directed to the ozone adsorbing operation. Oxygen gas is supplied from the oxygen supplying source 2 to the circulation system (L1, 3, 8-1, 4, 8-2) so that the pressure prevailing therein is maintained constantly at a predetermined or given pressure level.

In practical applications, the pressure prevailing within the circulation system (L1, 3, 8-1, 4, 8-2) is usually maintained at a level within a range from 1.5 to 2 $kg/cm^2$. When oxygen gas is forced to flow through the ozone recirculation system by means of the circulating blower 3 in the state in which the change-over valves 8-3 and 8-4 are opened, a part of oxygen gas is transformed into ozone (i.e., ozonized) under the effect of silent electric discharge when oxygen gas passes through an electric discharge gap defined between electrodes disposed within the ozone generator 1, whereby ozonized oxygen gas (i.e., oxygen gas containing ozone molecules) is produced to be subsequently transported to the adsorption/desorption tower 4. The adsorbent charged in the adsorption/desorption tower 4 adsorbs selectively ozone molecules from the ozonized oxygen gas. Residual oxygen gas is fed back to the circulating blower 3 by way of the change-over valve 8-3. The amount of oxygen consumed for the ozonization is supplemented from the oxygen supplying source 2.

Because the ozonized oxygen gas discharged from the ozone generator 1 is caused to flow through the electric discharge gap, it has a higher temperature than that of the oxygen gas flow introduced to the inlet port of the ozone generator 1. On the other hand, the temperature of oxygen gas discharged from the adsorption/desorption tower 4 is low when compared with that of the ozonized oxygen gas flow introduced to the inlet of the adsorption/desorption tower 4, because the former is caused to flow through the cooled adsorbent such as silica gel.

The heat exchanger 28 is provided for realizing heat exchange between the ozonized oxygen gas discharged from the ozone generator 1 and the oxygen gas flow discharged from the adsorption/desorption tower 4. Owing to the provision of the heat exchanger 28 as described above, heat emitted from the ozonized oxygen gas flow can be suppressed, while the adsorbent filled in the adsorption/desorption tower 4 can be protected against heating by the oxygen gas to an advantageous effect. Additionally, the amount of electric energy required for cooling the adsorption/desorption tower 4 to a temperature lower than −4020 C. can be reduced.

Embodiment 7

In each of the ozone storage systems described above, no consideration is paid to adjustment of pressure within the circulation system. In the ozone storage system according to a seventh embodiment of the invention, there is provided a pressure regulating unit in the circulation system for adjusting the pressure therein.

Figure 12:
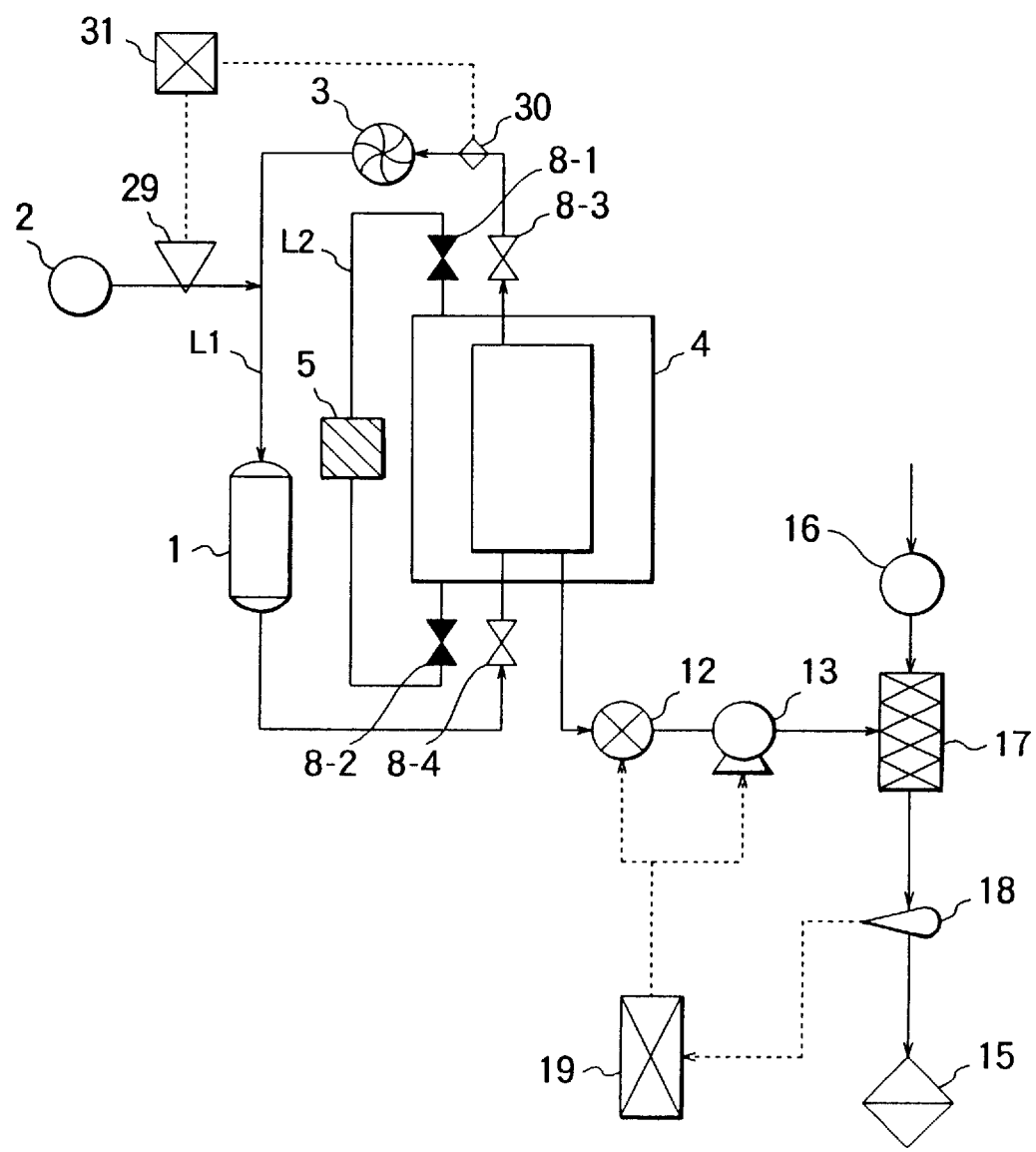
FIG. 12 is a schematic diagram showing generally a structure of an ozone storage system according to a seventh embodiment of the present invention.

FIG. 12 is a schematic diagram showing generally a structure of an ozone storage system according to the seventh embodiment of the invention. As can be seen in the figure, a pressure regulating unit 29 is provided for adjusting the pressure within the circulating pipe L1 interconnecting the ozone generator 1 and the adsorption/desorption tower 4 in combination with an ozone detector 30 disposed in the circulating pipe L1 at a position upstream of the circulating blower 3 for detecting ozone leaking from the adsorption/desorption tower 4, and a controller 31 for generating a control signal on the basis of the detection signal supplied from the ozone defecter 30, the control signal being then supplied to the pressure regulating unit 29.

Operation of the ozone storage system according to the instant embodiment will be described. The ozone storage system now under consideration has also two operation modes, i.e., ozone adsorbing operation mode and ozone desorbing operation mode. Since the ozone desorbing operation is essentially same as that described hereinbefore in conjunction with the first embodiment, repeated description thereof will be unnecessary. The following description will be directed to the ozone adsorbing operation. Oxygen gas is supplied from the oxygen gas supplying source 2 to the circulating pipe L1 interconnecting the ozone generator 1, the circulating blower 3 and the adsorption/desorption tower 4 by way of the pressure regulating unit 29 so that the pressure prevailing therein is maintained constantly at a predetermined or given pressure level.

When the oxygen gas is forced to flow through the circulating pipe L1 by means of the circulating blower 3 in the state in which the change-over valves 8-3 and 8-4 are opened, a part of oxygen gas flow is transformed into ozone (i.e., ozonized) under the action of silent electric discharge when the oxygen gas flow passes through an electric discharge gap defined between electrodes disposed within the ozone generator 1, whereby ozonized oxygen gas (i.e., oxygen gas containing ozone molecules) is produced to be subsequently transported to the adsorption/desorption tower 4. The adsorbent charged in the adsorption/desorption tower 4 adsorbs selectively the ozone molecules from the ozonized oxygen gas. The residual oxygen gas is fed back to the circulation system in the direction toward the circulating blower 3 by way of the change-over valve 8-3. Parenthetically, the amount of oxygen consumed for the ozonization is supplemented from the oxygen supplying source 2.

When ozone molecules have been adsorbed by the adsorbent to a certain extent, the adsorption breakthrough phenomenon mentioned hereinbefore starts to take place, resulting in leakage of the ozone gas from the adsorption/desorption tower 4. In that case, the ozone detector 30 installed in the circulating pipe L1 connected to the adsorption/desorption tower 4 at a side upstream of the circulating blower 3 detects the leakage of ozone, as a result of which an ozone leakage detection signal is supplied to the controller 31 from the ozone detector 30.

In response to the leakage detection signal, the controller 31 operates to increase the pressure prevailing within the circulating pipe L1 by supplying a control signal to the pressure regulating unit 29. In that case, the controller 31 is so designed as to increase the pressure within the circulating pipe L1 such that the partial pressure of ozone contained in the ozonized oxygen gas flow supplied to the adsorption/desorption tower 4 increases constantly. Owing to this process, the pressure within the circulating pipe L1 will attain a desired final pressure.

Figure 13:
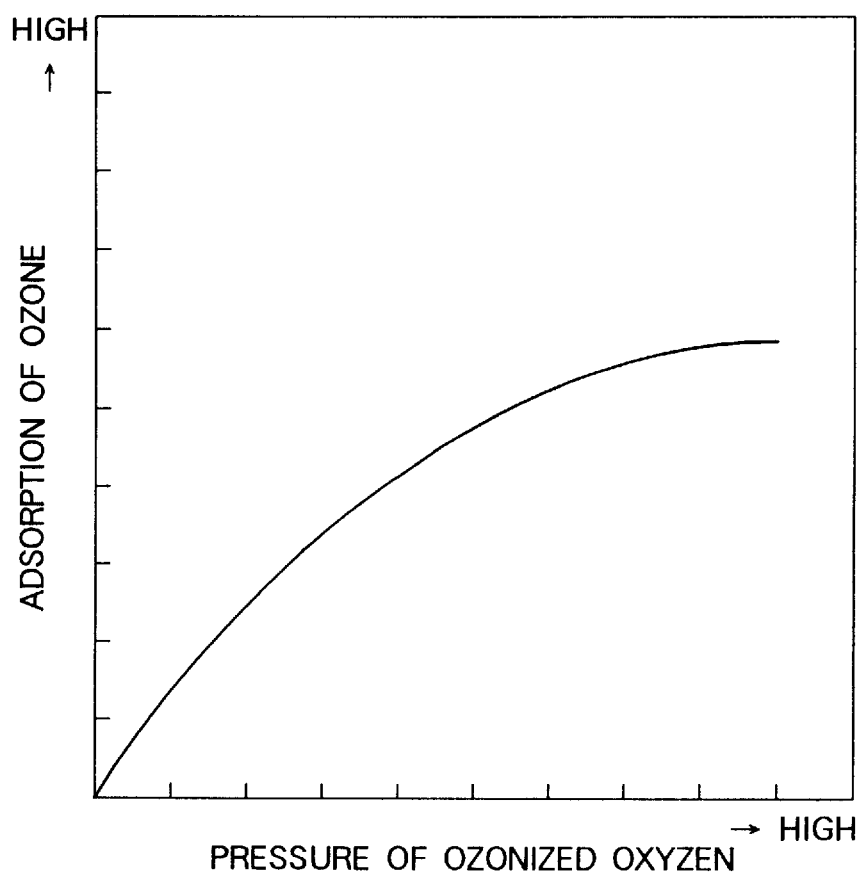
FIG. 13 is a view for illustrating graphically a relation between a pressure of ozonized oxygen gas and ozone adsorption.
Figure 14:
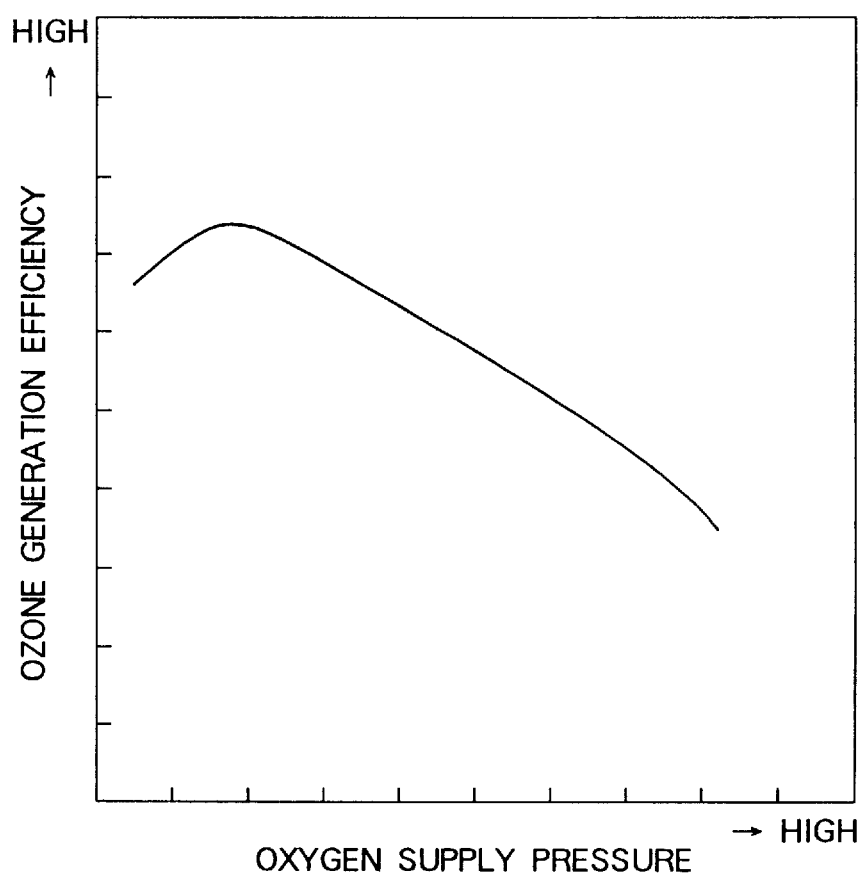
FIG. 14 is a view for illustrating graphically a relation between a pressure of ozonized oxygen gas and ozone production efficiency.

Next, referring to FIGS. 13 and 14, description will be made of the results of experiments performed for determining the influence of the pressure within the adsorption/desorption tower 4 in the ozone adsorbing/storing operation mode. FIG. 13 is a view for graphically illustrating a relation between the ozone adsorption quantity and the pressure of the ozonized oxygen gas flow introduced into the adsorption/desorption tower 4. As can be seen in FIG. 13, the amount of ozone adsorption (i.e., ozone adsorption quantity) increases as the pressures of the ozonized oxygen gas flow rises up. On the other hand, FIG. 14 is a view for illustrating a relation between an ozone production efficiency and a pressure at which oxygen gas employed as the raw material or gas is charged or supplied. As is apparent from FIG. 14, the ozone production efficiency becomes lower as the oxygen supply pressure increases.

Figure 15:
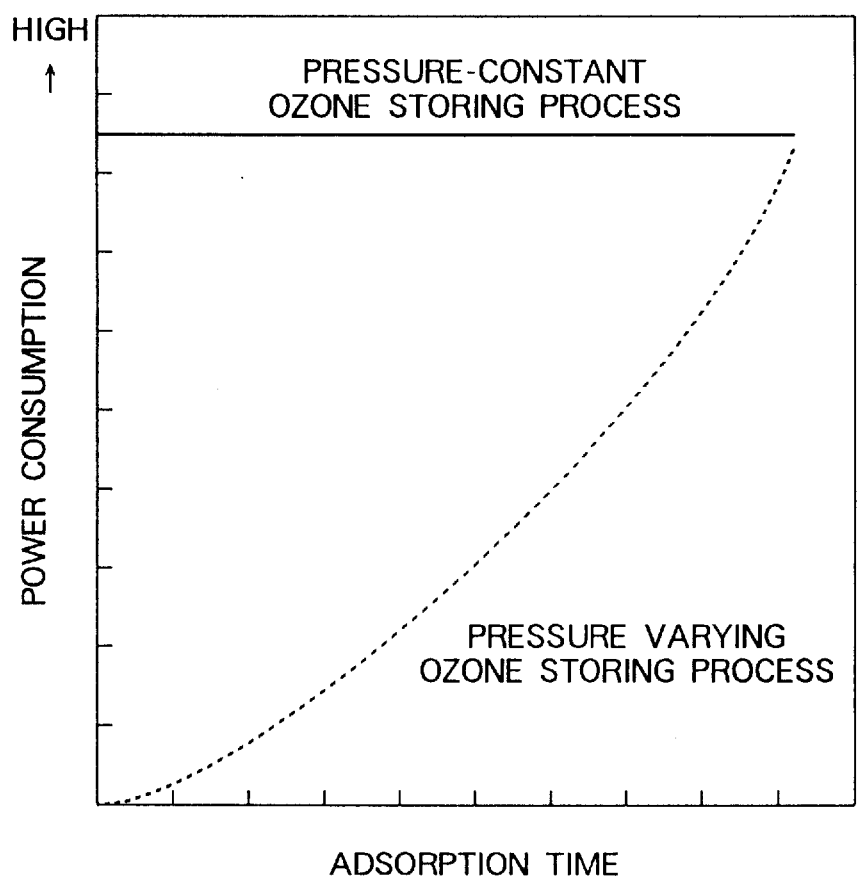
FIG. 15 is a view for illustrating graphically relations between a temporal duration for ozone adsorption and power consumption in an ozone adsorbing operation mode with pressure being used as a parameter.

Thus, it will be understood that although ozone can be adsorbed by the adsorbent with high efficiency by increasing the pressure within the adsorption/desorption tower 4, the electric power consumption involved in the production of ozone (i.e., ozonization) increases. In this conjunction, FIG. 15 graphically illustrates a relation between power consumption required for the ozone production and a temporal duration for the ozone adsorption. As can be seen by comparing a solid-line curve and a broken-line curve shown in FIG. 15, the electric power consumed for the production of ozone during the adsorbing period can be reduced by increasing gradually the pressure within the adsorption/desorption tower 4 from a starting time point of the adsorbing operation (broken-line curve) when compared with the adsorbing operation mode performed with the pressure within the adsorption/desorption tower 4 being initially set at a desired pressure (solid-line curve).

Further, it will be noted that when the pressure within the adsorption/desorption tower 4 is set excessively high, the partial pressure of oxygen also increases, which promotes adsorption of the oxygen molecules by the adsorbent, resulting in that the rate at which ozone molecules are adsorbed is lowered. Accordingly, the desired final pressure for the adsorbing operation mode should be set in a range of 4±2 kg/cm$^2$ in terms of the absolute pressure in order to ensure a possible maximum efficiency for the production of the ozone molecules.

As will now be apparent from the above, adsorption of the ozone molecules for storage thereof should preferably be carried out by increasing gradually or stepwise the partial pressure of ozone contained in the ozone containing oxygen gas supplied to the adsorption/desorption tower 4, because then energy or electric power required for the ozone storage can be reduced.

Embodiment 8

Figure 16:
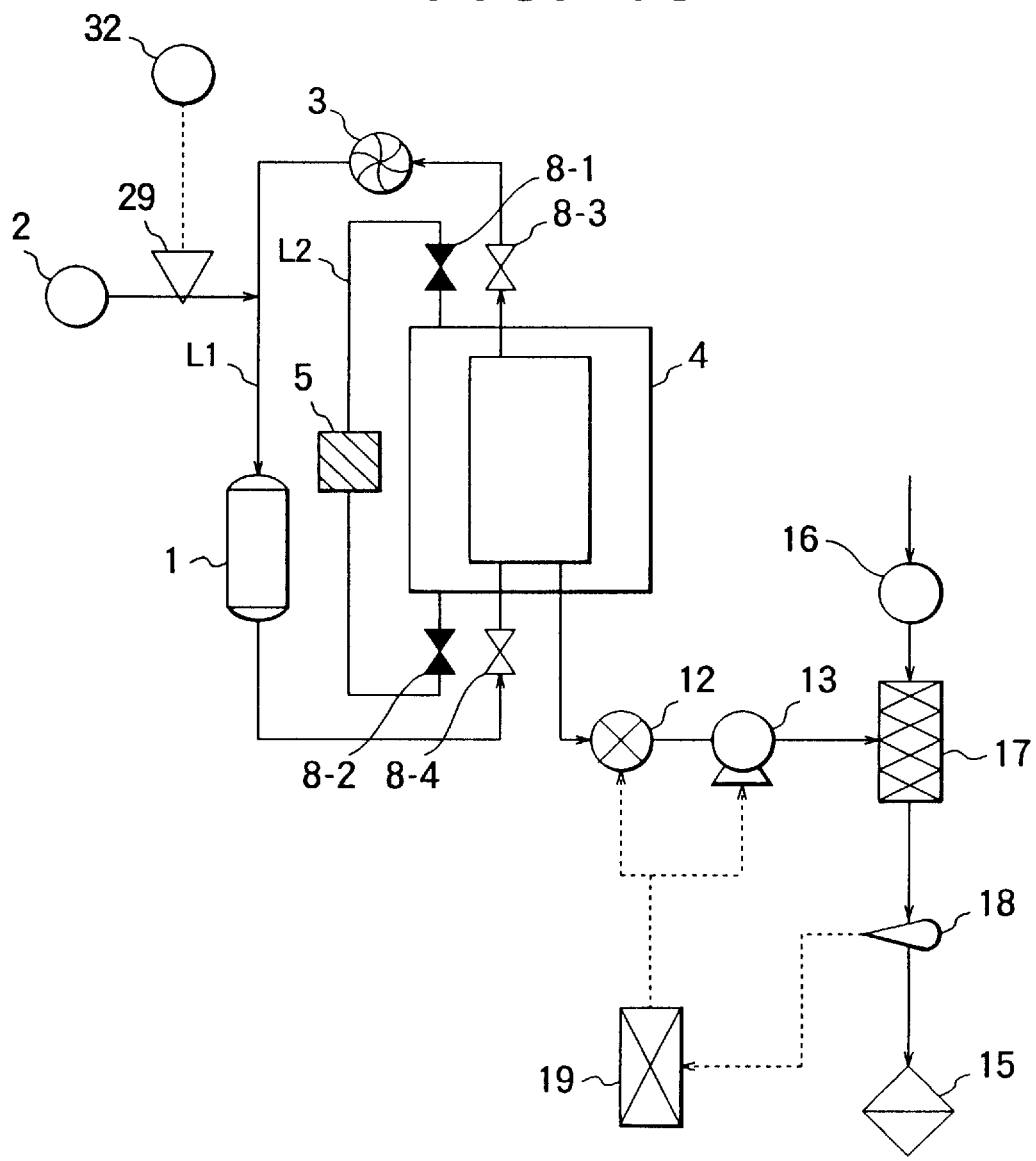
FIG. 16 is a schematic diagram showing generally a structure of an ozone storage system according to an eighth embodiment of the present invention.

In the case of the ozone storage system according to the seventh embodiment, the pressure within the circulating pipe L1 and hence the pressure within the adsorption/desorption tower 4 is progressively increased by means of the pressure regulating unit 29 in response to the output signal of the ozone detector 30 which is designed for detecting the ozone leakage from the adsorption/desorption tower 4. In the ozone storage system according to an eighth embodiment of the invention, the pressure regulating unit 29 is operated under the control of a timer 32 such that the pressure within the recirculation system increases gradually as a function of time lapse, as is shown in FIG. 16. With this arrangement, advantageous effect can be obtained as in the case of the ozone storage system according to the seventh embodiment of the invention.

Alternatively, the pressure regulating unit 29 itself may be so programmed previously that the pressure within the recirculation system increases gradually. Further, as a result of this, the ozone detector 30 and the controller 31 can be spared, which means that the cost of equipment can be reduced correspondingly.

Embodiment 9

Figure 17:
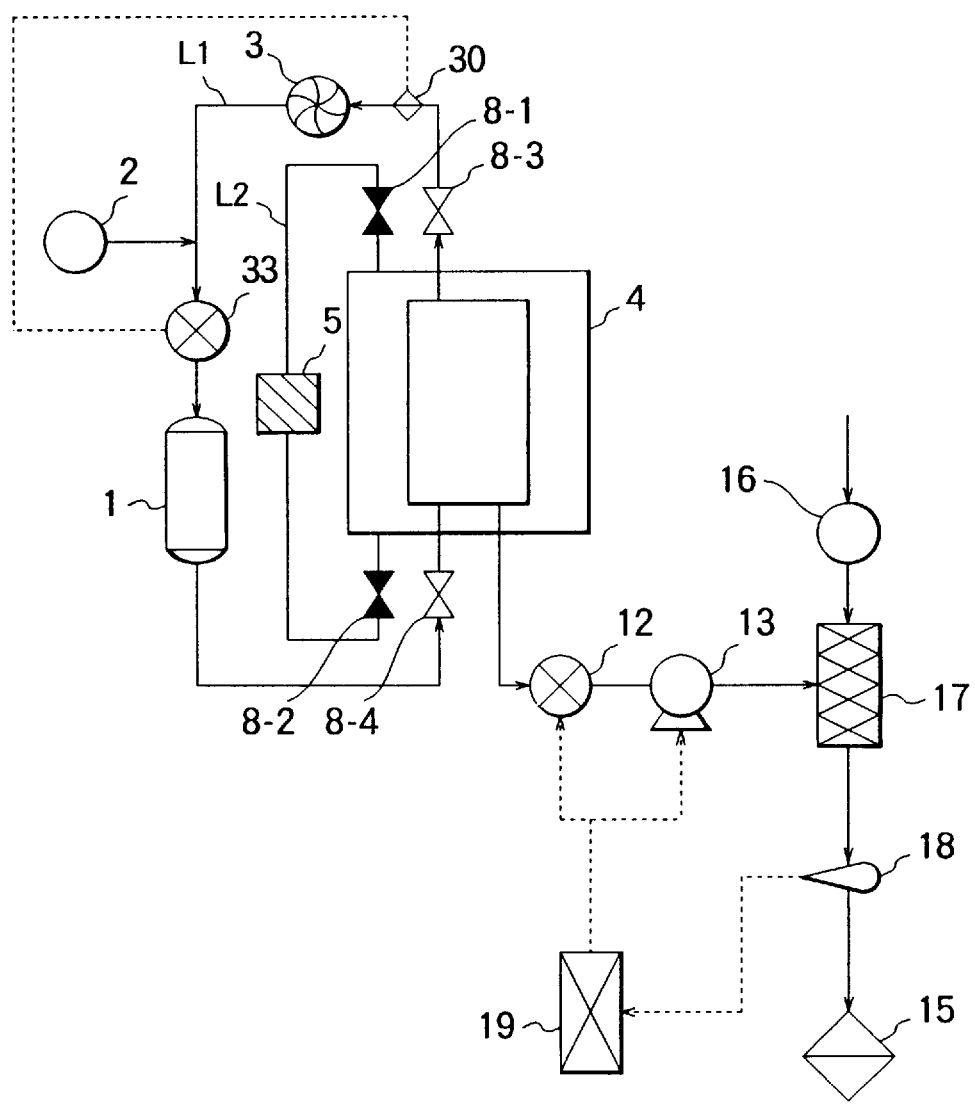
FIG. 17 is a schematic diagram showing generally a structure of an ozone storage system according to a ninth embodiment of the present invention.

In the ozone storage system according to the eighth embodiment of the invention, the pressure within the circulation system is controlled to be constant. On the other hand, the ozone storage system according to a ninth embodiment of the invention is so arranged that the flow rate of the gas flowing through the circulating pipe L1 is regulated. FIG. 17 is a schematic diagram showing a structure of the ozone storage system according to the ninth embodiment of the invention. In this figure, components same as or equivalent to those shown in FIG. 16 are denoted by like reference character. In FIG. 17, a reference numeral 33 denotes a gas flow control unit for adjusting the flow rate of a gas (oxygen) flowing through the circulating pipe L1.

Operation of the ozone storage system according to the ninth embodiment of the invention will be described. The ozone storage system now of concern also has two operation modes, i.e., ozone adsorbing operation mode and ozone desorbing operation mode. Since the ozone desorbing operation mode is essentially same as that described hereinbefore in conjunction with the first embodiment, repetition of description thereof is omitted. Thus, the following description will be directed to the ozone adsorbing operation. Oxygen gas is supplied from the oxygen supplying source 2 to the circulating pipe L1 at such a rate that the pressure prevailing therein can be maintained constantly at a predetermined or desired pressure level.

In practical applications, the pressure within the circulation system is usually maintained at a level within a range from 1.5 to 2 kg/cm$^2$. When the oxygen gas is caused to flow through the circulating pipe L1 by means of the circulating blower 3 with the change-over valves 8-3 and 8-4 being opened, a part of the oxygen gas is transformed into ozone under the effect of the silent electric discharge when oxygen gas passes through an electric discharge gap defined within the ozone generator 1, whereby ozonized oxygen gas (i.e., oxygen gas containing ozone molecule) is produced to be subsequently transported to the adsorption/desorption tower 4. The adsorbent charged in the adsorption/desorption tower 4 adsorbs selectively ozone molecules from the ozonized oxygen gas. The residual oxygen gas is fed back to the circulation system by way of the change-over valve 8-3. Oxygen consumed for the ozonization is supplemented from the oxygen supplying source 2.

When ozone has been adsorbed by the adsorbent to a certain extent, the adsorption breakthrough phenomenon mentioned hereinbefore starts to take place, incurring leakage of the ozone gas from the adsorption/desorption tower 4. In that case, the ozone detector 30 detects the leakage of ozone, as a result of which a leakage detection signal is supplied to the gas flow control unit 33 from the ozone detector 30. In response to the leakage detection signal, the gas flow control unit 33 decreases the flow rate of the gas flowing through the circulating pipe L1 so that the concentration of ozone molecules contained in the ozonized oxygen gas arriving at the inlet of the adsorption/desorption tower 4 increases progressively. In that case, the flow rate of the gas flowing through the circulating pipe L1 is decreased gradually so that the partial pressure of ozone contained in the ozonized oxygen gas flow supplied to the adsorption/desorption tower 4 increases gradually. Owing to this process, the pressure within the circulating pipe L1 will attain a desired final ozone concentration.

Figure 18:
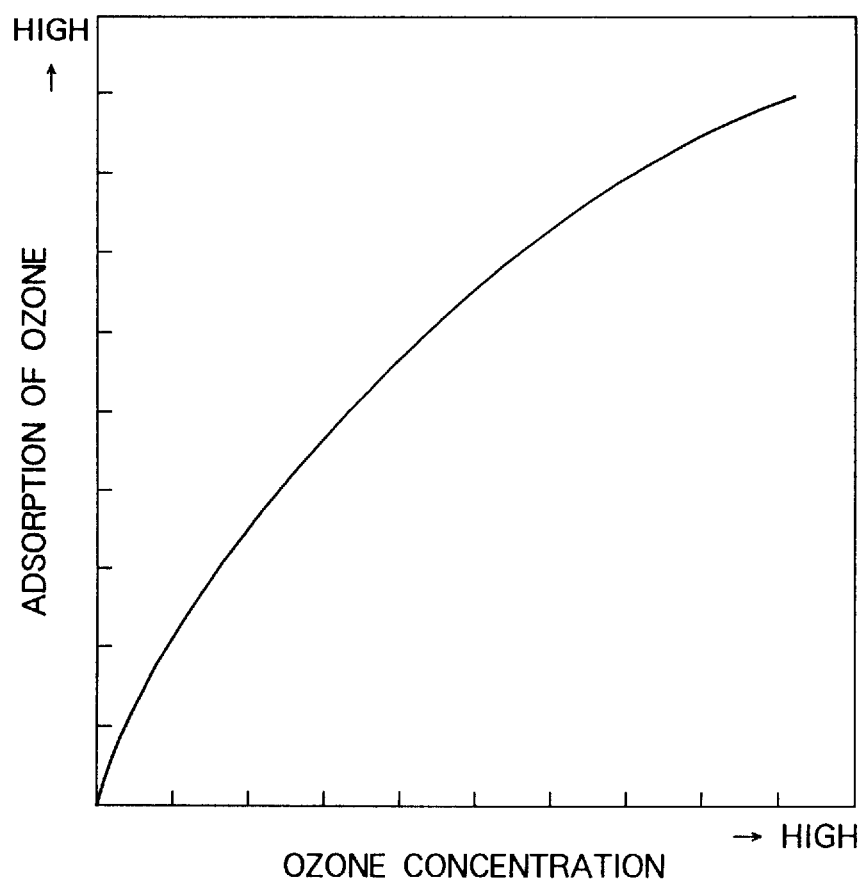
FIG. 18 is a view for illustrating graphically a relation between concentration of ozone contained in the ozonized oxygen gas flow and ozone adsorption.

Next, referring to FIGS. 18 and 19, description will be made of results of experiments performed for determining the influence of the concentration of ozone contained in the ozonized oxygen gas supplied to the adsorption/desorption tower 4 in the ozone adsorbing/storing operation mode. FIG. 18 is a view for graphically illustrating a relation between the ozone adsorption quantity and the concentration of ozone contained in the ozonized oxygen gas flow introduced to the adsorption/desorption tower 4. As can be seen in FIG. 18, the amount of ozone adsorbed increases as the concentration of ozone increases.

Figure 19:
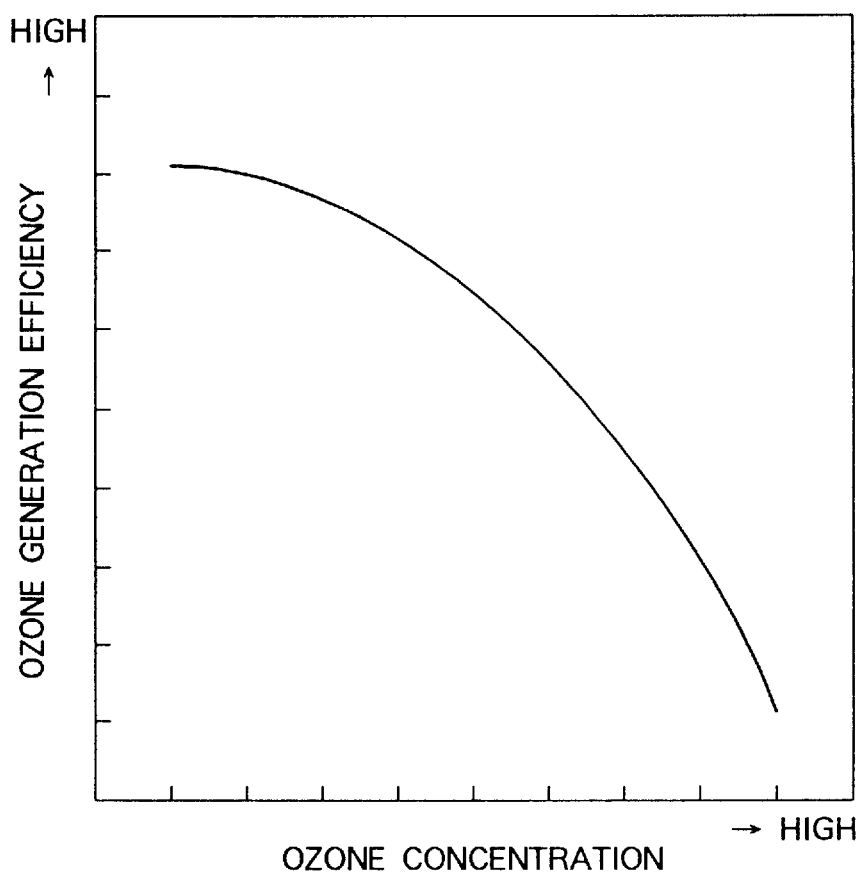
FIG. 19 is a view for illustrating graphically a relation between ozone concentration of an ozonized oxygen gas and an ozone production efficiency.

On the other hand, FIG. 19 is a view for graphically illustrating a relation between an ozone production efficiency and the concentration of ozone contained in the ozonized oxygen gas as produced (i.e., oxygen gas containing ozone molecules). As is apparent from FIG. 19, the ozone production efficiency becomes lower as the ozone concentration of the ozonized oxygen gas increases. Thus, it will be understood that although the ozone molecules can be adsorbed by the adsorbent with enhanced efficiency by increasing the ozone concentration of the ozonized oxygen gas reaching the inlet of the adsorption/desorption tower 4, the electric power consumption involved in the production of ozone increases.

Figure 20:
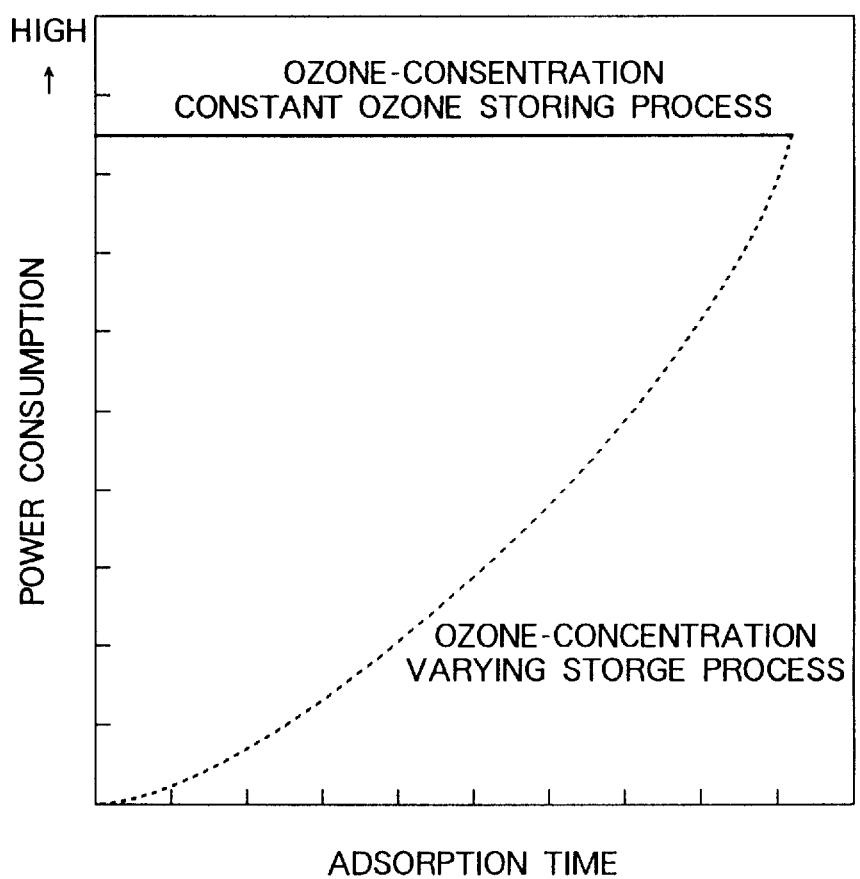
FIG. 20 is a view for illustrating graphically relations between a temporal duration for ozone adsorption and power consumption in an ozone adsorbing operation mode with pressure being used as parameter.

In this conjunction, FIG. 20 graphically illustrates a relation between power consumption required for the ozone production and a temporal duration for the ozone adsorption. As can be seen by comparing a solid-line curve and a broken-line curve shown in FIG. 20, the electric power consumed for production of ozone during the ozone adsorbing period can be reduced by increasing gradually the ozone concentration from the start of the adsorbing operation to a desired pressure level (see broken-line curve) when compared with the adsorbing operation performed with the ozone concentration set initially at the desired pressure (see solid-line curve).

As is now apparent from the above, adsorption of ozone for storage thereof should preferably be carried out by increasing gradually the concentration of ozone molecules contained in the ozonized oxygen gas supplied to the adsorption/desorption tower 4, because then energy or electric power required for the ozone storage can be decreased, to a profitable effect.

In the case of the ozone storage system described above, the concentration of ozone is detected for the purpose of increasing progressively the ozone concentration of the gas supplied to the adsorption/desorption tower 4. To this end, however, the gas flow control unit 33 may be so operated under the control of a timer (not shown) that the flow rate of the gas flowing through the circulating pipe L1 decreases gradually as a function of time lapse.

Alternatively, the gas flow control unit 33 itself may be so programmed previously that the gas flow rate decreases gradually, substantially to the same effect. Further, the ozone detector 30 can be spared by using the timer (not shown), which means that the cost of equipment can be reduced correspondingly.

Embodiment 10

Figure 21:
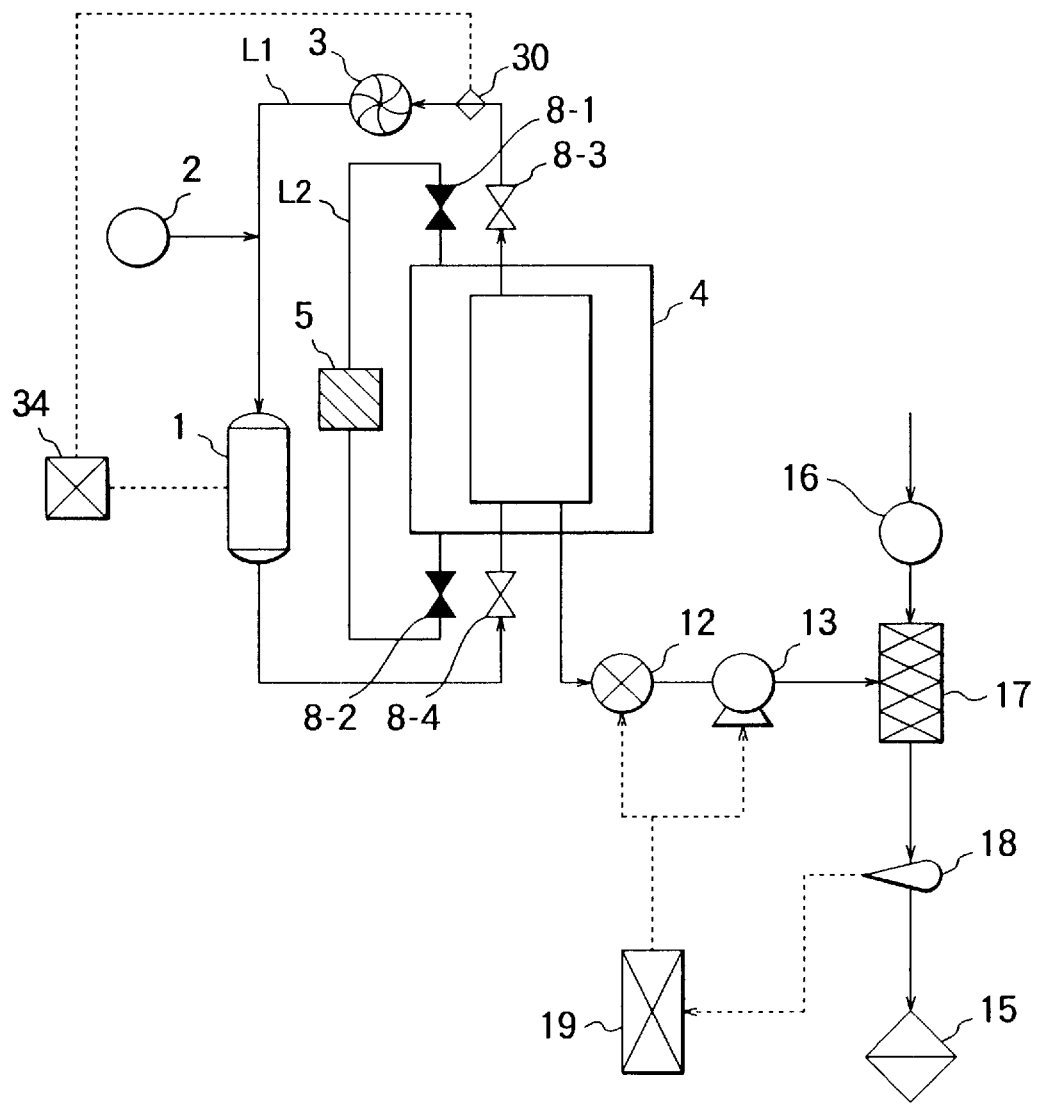
FIG. 21 is a schematic diagram showing generally a structure of an ozone storage system according to a tenth embodiment of the present invention.

In the case of the ozone storage system according to the ninth embodiment, the flow rate of the gas flowing through the circulating pipe L1 is progressively decreased by means of the gas flow control unit 33 in response to the output signal of the ozone detector 30 which is designed for detecting the ozone gas leaking from the adsorption/ desorption tower 4, to thereby increase the ozone concentration. However, to the substantially same effect, an electric power control unit 34 may be provided for increasing the electric power supplied to the ozone generator 1 in response to the output of the ozone detector 30 designed for detecting ozone leaking from the adsorption/desorption tower 4 with a view to promoting the production of ozonized oxygen gas for thereby increasing gradually the concentration of ozone contained in the gas supplied to the adsorption/desorption tower 4, as shown in FIG. 21.

In the case of the ozone storage system described just above, the concentration of ozone is sensed for increasing progressively the ozone concentration of the gas supplied to the adsorption/desorption tower 4 by means of the electric power control unit 34. In this conjunction, however, the electric power control unit 34 may be so operated under the control of a timer (not shown) that the ozone concentration of the ozonized oxygen gas fed to the adsorption/desorption tower 4 increases gradually as a function of time lapse.

Alternatively, the electric power control unit 34 itself may be so programmed beforehand as to increase the electric power so that the ozone concentration of the ozonized oxygen gas can increase gradually, substantially to the same effect.

Embodiment 11

Figure 22:
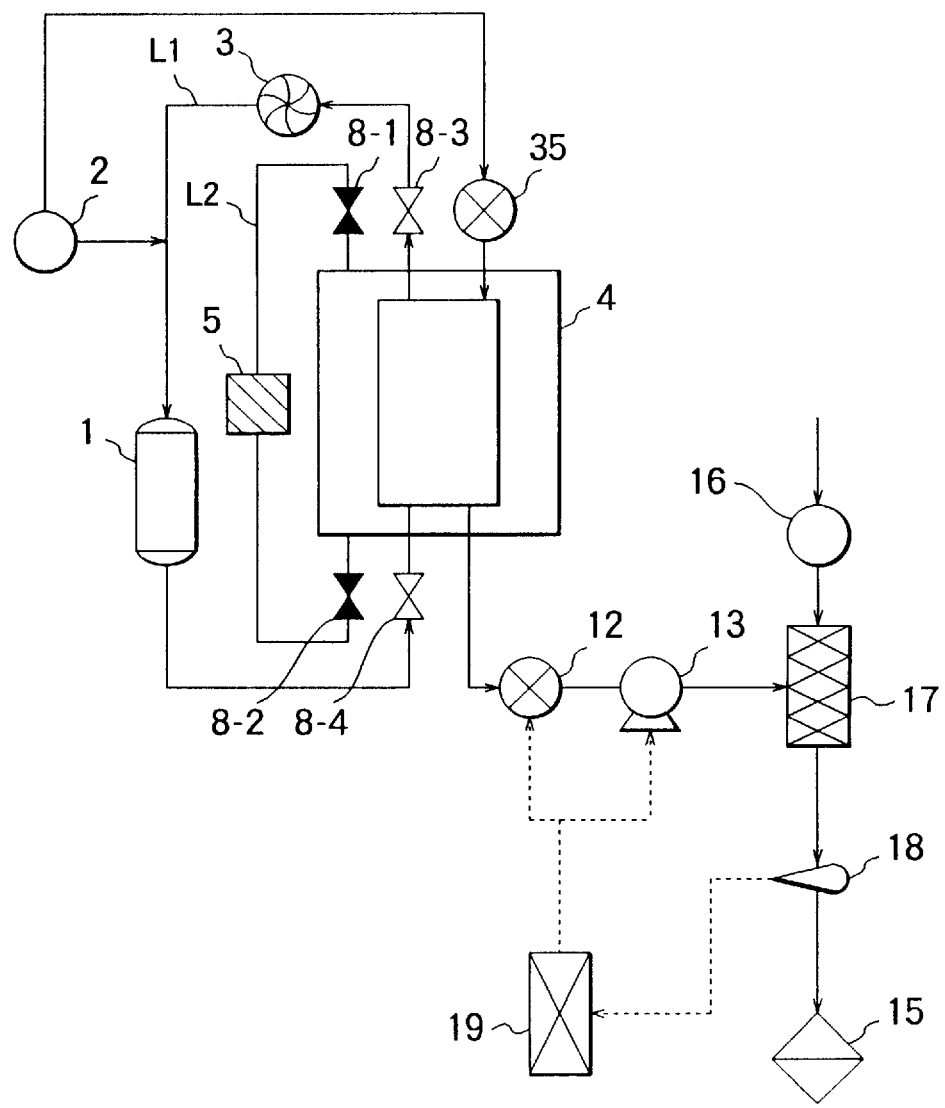
FIG. 22 is a schematic diagram showing generally a structure of an ozone storage system according to an eleventh embodiment of the present invention.

In the case of the ozone storage systems described hereinbefore in conjunction with the seventh to tenth embodiments, respectively, the oxygen supplying source 2 is so arranged as to supply the oxygen gas to the circulation system. According to the invention incarnated in an eleventh embodiment thereof, the oxygen gas is supplied to the adsorption/desorption tower 4 while adjusting or regulating the flow rate of oxygen gas in the ozone desorption operation mode. FIG. 22 is a schematic diagram showing generally a structure of the ozone storage system according to the eleventh embodiment of the invention. In the figure, components same as or equivalent to those shown in FIG. 12 are designated by like reference characters. Referring to FIG. 22, reference numeral 35 denotes an oxygen gas flow control unit which regulates the flow rate of the oxygen gas supplied from the oxygen supplying source 2 to the adsorption/ desorption tower 4 in the ozone desorption operation mode.

Description will next be made of operation of the ozone storage system according to the instant embodiment. The ozone storage system now of concern also operates in two operation modes, i.e., ozone adsorbing operation mode and ozone desorbing operation mode. Since the ozone adsorbing operation is same as that described hereinbefore in conjunction with the first embodiment, repeated description thereof is omitted. When the ozone adsorbent of the adsorption/ desorption tower 4 reaches the state near to the saturated adsorption state, operation of the ozone storage system is changed over to the ozone desorbing operation mode. In this case, operations of the ozone generator 1, the circulating blower 3 and the coolant supply source 5 are stopped with the change-over valves 8-1, 8-2, 8-3 and 8-4 being closed.

Subsequently, the gas suction pump 13 is first put into operation with the flow-path cross-sectional area of the ozone gas flow regulating unit 12 being opened gradually to thereby allow ozone to be supplied to the gas mixing unit 17. At the same time, a carrier gas is supplied to a gas mixing unit 17 from a carrier gas generator 16, as a result of which the ozone gas and the carrier gas are mixed together by the gas mixing unit 17, whereby an ozone containing gas is produced to be supplied to the ozone consumer 15.

In an initial period during which a sufficient amount of ozone is discharged from the adsorption/desorption tower, the ozone concentration of the ozone containing gas discharged from the gas mixing unit 17 is measured by the ozone densimeter 18, the output signal of which is sent to the control unit 19. When the ozone concentration is higher than a preset or desired ozone concentration, a corresponding control signal is supplied to the ozone gas flow regulating unit 12 from the control unit 19, whereby the flow-path cross-sectional area of the ozone gas flow regulating unit 12 is decreased to a small extent such that the actual ozone concentration conforms with the preset or desired ozone concentration. At the same time, a control signal is supplied from the control unit 19 to the gas suction pump 13 as well to enfeeble the suction of ozone from the adsorption/ desorption tower 4 for thereby lowering the ozone concentration of the oxygen containing gas discharged from the adsorption/desorption tower 4.

By contrast, when the ozone concentration of the ozone containing gas is lower than the preset ozone concentration, a control signal is supplied to the ozone gas flow regulating unit 12 from the control unit 19, whereby the flow-path cross-sectional area of the ozone gas flow regulating unit 12 is increased a little. At the same time, a control signal is sent to the gas suction pump 13 as well from the control unit 19 to increase or intensify the suction of ozone from the adsorption/desorption tower 4 for thereby increasing correspondingly the amount of ozone molecules discharged from the adsorption/desorption tower 4 and hence the ozone concentration of the ozone containing gas. Consequently, the ozone concentration of the ozone containing gas is increased. In that case, the control unit 19 supplies to the carrier gas generator 16 a control signal indicative of the change in the amount of ozone supplied to the gas mixing unit 17, whereby the flow rate of the ozone containing gas supplied to the ozone consumer 15 is controlled such that it conforms with the preset flow rate.

In this way, the ozone containing gas which contains ozone molecules at a predetermined concentration can be supplied constantly to the ozone consumer 15 at a predetermined flow rate.

When the amount of ozone drawn from the adsorption/ desorption tower 4 by the gas suction pump 13 deceases in a second half of the ozone desorption operation mode with the gas suction power of the gas suction pump 13 reaching a maximum level, the flow-path cross-sectional area of the oxygen gas flow control unit 35 is gradually increased, whereby supply of oxygen gas to the adsorption/desorption tower 4 from the oxygen supplying source 2 is started, whereupon the gas substitution phenomenon takes place, making more active the desorption of the ozone from the adsorption/desorption tower 4.

In that case, the amount of desorption of ozone molecules can be controlled in dependence on the flow rate of the oxygen gas. More specifically, by decreasing gradually the flow rate of the carrier gas fed to the gas mixing unit 17 from the carrier gas generator 16 while increasing progressively the flow rate of the oxygen gas supplied to the adsorption/desorption tower 4 for the purpose of making constant the flow rate of the oxygen containing gas supplied to the ozone consumer 15, it is possible to supply the ozone containing gas at a constant concentration to the ozone consumer 15 continuously at a substantially constant flow rate.

In this manner, by desorbing ozone from the adsorption/desorption tower 4 by maintaining a negative pressure or vacuum state within the adsorption/desorption tower 4 while supplying oxygen gas to the adsorption/desorption tower 4, the amount of oxygen gas as consumed can be reduced while suppressing the cold deprived of the adsorption/desorption tower 4 by the oxygen gas flow can be decreased when compared with a gas-purge type ozone storage system where the oxygen gas is simply fed to the adsorption/desorption tower 4. In addition, energy or electric power required for feeding the oxygen gas to the adsorption/desorption tower 4 can be reduced, to a further advantageous effect.

Furthermore, when compared with the ozone storage system of gas suction type designed simply for extraction of the ozone molecules by means of the gas suction pump 13, the power required for driving the gas suction pump 13 can be decreased. In other words, ozone can be drawn by using a low-power rated pump of a small capacity can be used as the gas suction pump 13.

In the ozone storage system according to the instant embodiment described just above, the ozone concentration of the ozone containing gas supplied to the ozone consumer 15 is detected by the ozone densimeter 18 whereby a control signal is sent to the control unit 19, and thus the control unit 19 controls the ozone gas flow regulating unit 12, the gas suction pump 13, the carrier gas generator 16 and the oxygen gas flow control unit 35 to thereby change or modify the operations such that the ozone containing gas containing ozone at a predetermined concentration can be supplied to the ozone consumer 15 constantly at a predetermined flow rate. However, by driving the ozone gas flow regulating unit 12, the gas suction pump 13, the carrier gas generator 16 and the oxygen gas flow control unit 35 in accordance with a program or programs prepared beforehand, substantially same advantageous effects can be achieved.

In that case, the ozone densimeter 18 and the control unit 19 can be spared with the cost of equipment being reduced correspondingly.

Further, in conjunction with the instant embodiment of the invention, description has been made of the ozone storage system in which the ozone concentration of the ozone containing gas supplied to the ozone consumer 15 is detected by the ozone densimeter 18 to thereby sent a control signal to the control unit 19, whereupon the control unit 19 controls the ozone gas flow regulating unit 12, the gas suction pump 13, the carrier gas generator 16 and the oxygen gas flow control unit 35 change their operations so that the ozone containing gas which contains ozone at a predetermined concentration is supplied to the ozone consumer 15 constantly at a predetermined flow rate.

However, in the ozone storage system described above, such modification may equally be adopted that the gas suction pump 13 constituting the ozone discharging means is replaced by a combination of the ozone gas flow regulating unit 12 for controlling the amount or flow of ozone discharged from the adsorption/desorption tower 4 and the gas ejector 21 for desorbing ozone from the adsorbent of the adsorption/desorption tower 4 after depressurization thereof, as shown in FIG. 5, while the carrier gas generator 16 and the gas mixing unit 17 constituting the ozone concentration control means is replaced by a combination of the bypass pipe 22 disposed in parallel with the gas ejector 21 for interconnecting the inlet and the outlet of the gas ejector 21, the compressed gas generator 23 for producing a compressed carrier gas for driving the gas ejector 21 and the two-way flow regulating valve 24 for regulating a flow ratio of the compressed carrier gas supplied to the gas ejector 21 and the gas supplied to the bypass pipe 22 from the compressed gas generator 23.

With the modified structure of the ozone storage system described above, when the control signal is received from the ozone densimeter 18, the control unit 19 can generate and send control signals to the ozone gas flow regulating unit 12, the compressed gas generator 23 and the two-way flow regulating valve 24, respectively, to thereby make it possible to supply the ozone containing gas which contains ozone at a predetermined constant concentration to the ozone consumer 15 constantly at a predetermined constant rate, as in the case of in the second embodiment of the invention.

Furthermore, because the oxygen gas is supplied to the adsorption/desorption tower 4, other substances than oxygen are prevented from being adsorbed by the adsorbent charged in the adsorption/desorption tower 4, whereby the adsorbent can be protected against degradation in performance with the elongated use life of the adsorbent being assured.

Embodiment 12

Figure 23:
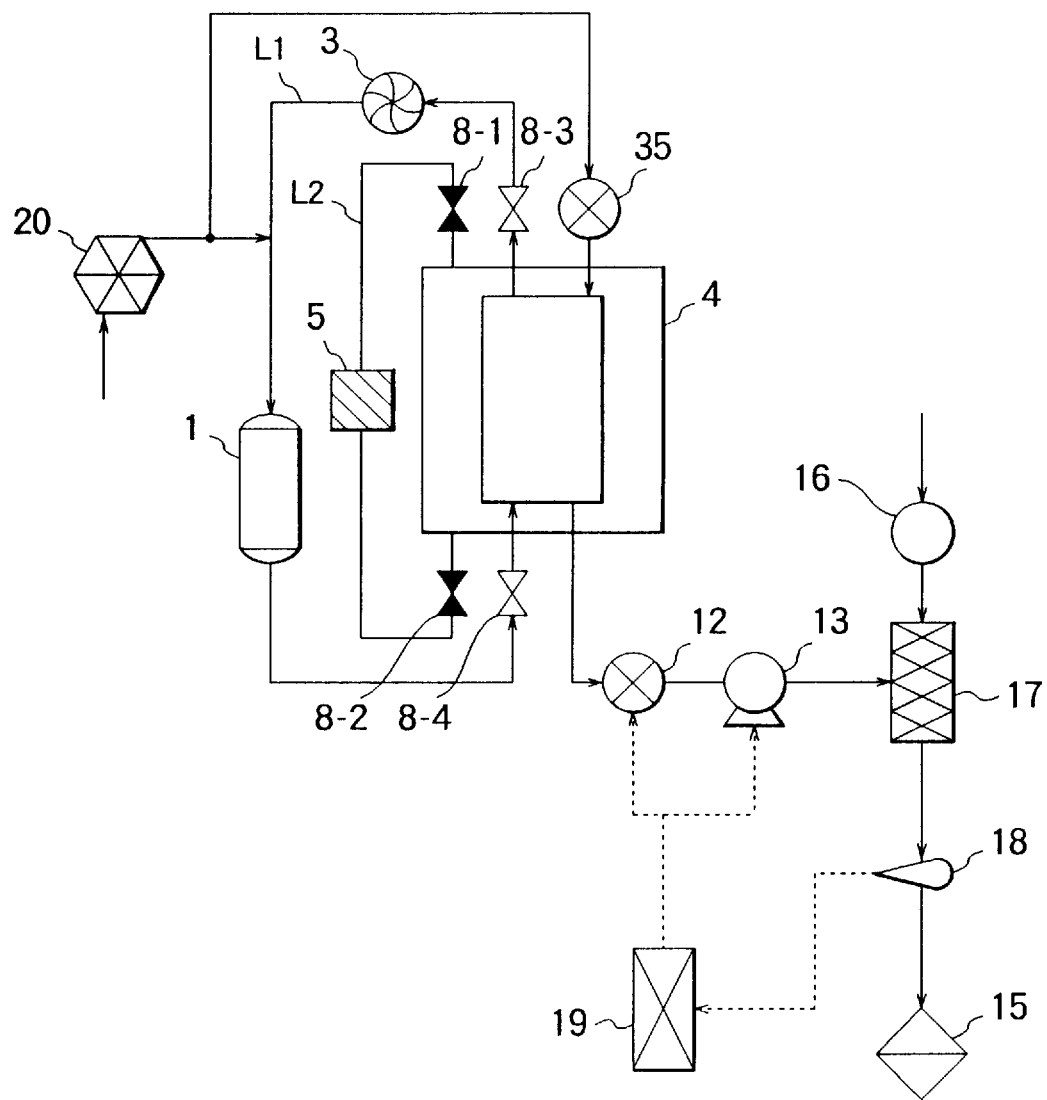
FIG. 23 is a schematic diagram showing generally a structure of an ozone storage system according to a twelfth embodiment of the present invention.

In the ozone storage system according to the eleventh embodiment of the invention, the oxygen gas is supplied to the adsorption/desorption tower 4 from the oxygen supplying source 2 in the ozone desorption operation mode. According to the invention incarnated in a twelfth embodiment thereof, it is taught that a low-temperature oxygen gas produced by evaporating liquid oxygen generated by the low-temperature processing unit 20 is supplied to the adsorption/desorption tower 4 in the ozone desorption operation mode in place of the oxygen supplying source 2, as is shown in FIG. 23.

Owing to the arrangement that the cooled oxygen gas is supplied to the adsorption/desorption tower 4 as mentioned above, the adsorption/desorption tower 4 can be protected against deprival of the cold, whereby temperature rise in the adsorption/desorption tower 4 can be prevented. Thus, energy required for cooling the adsorption/desorption tower 4 upon transition to the ozone adsorption operation mode can be reduced, to an advantage.

Embodiment 13

In the ozone storage system according to the twelfth embodiment described above, oxygen separated from air and cooled in the low-temperature processing unit 20 is supplied to the adsorption/desorption tower 4 in order to protect it against the temperature rise. According to a thirteenth embodiment of the invention, it is proposed to cool a part of the oxygen gas recirculated from the adsorption/desorption tower 4 and supply the cooled oxygen gas to the adsorption/desorption tower 4.

Figure 24:
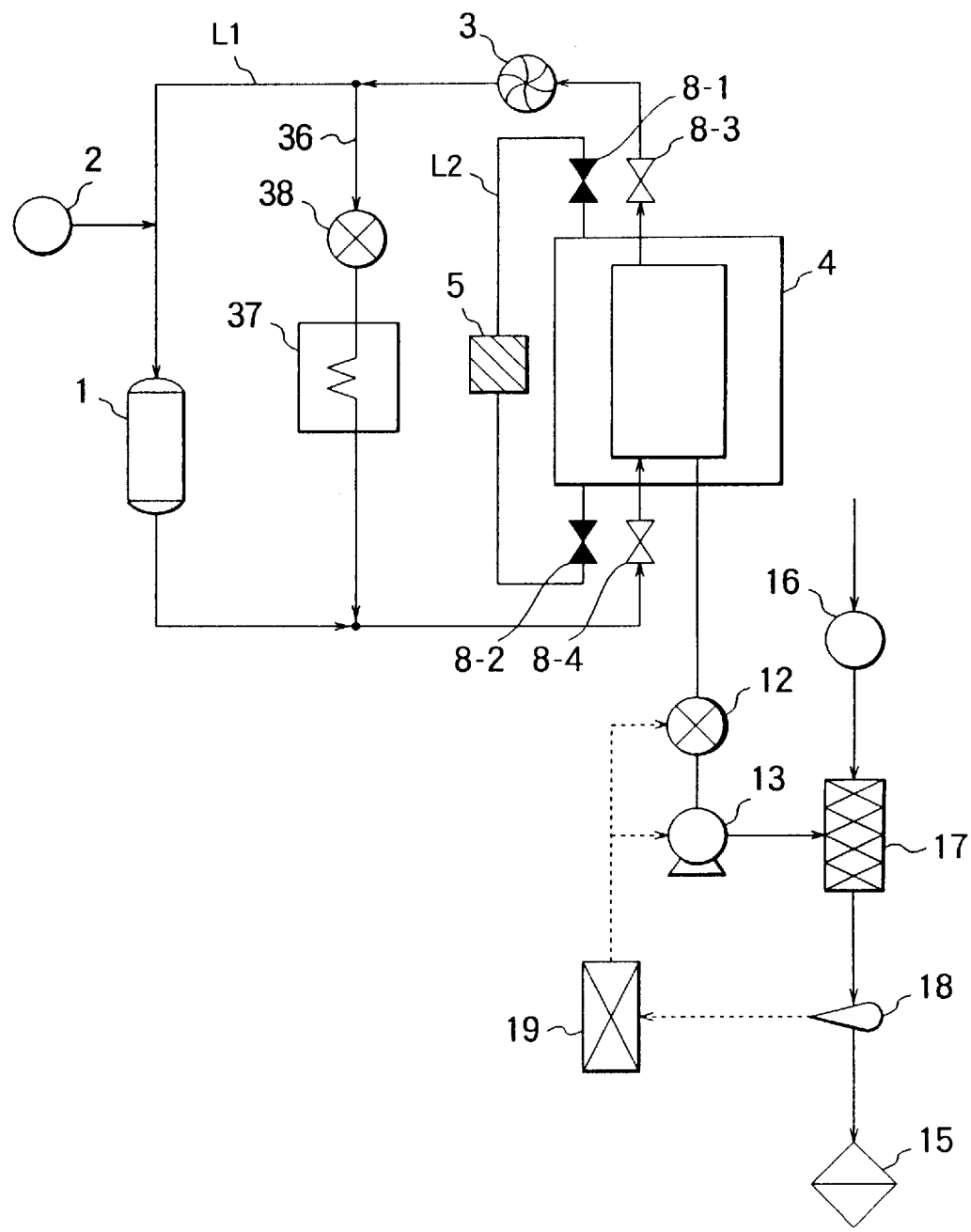
FIG. 24 is a schematic diagram showing generally a structure of an ozone storage system according to a thirteenth embodiment of the present invention.

FIG. 24 is a schematic diagram showing generally a structure of the ozone storage system according to the thirteenth embodiment of the invention. In the figure, components same as or equivalent to those shown in FIG. 22 are designated by like reference characters. Referring to FIG. 24, reference numeral 36 denotes a gas cooling pipe disposed at a location downstream of the circulating blower 3 and extending in parallel with the ozone generator 1, numeral 37 denotes a cooling unit for cooling a part of oxygen gas recirculated to the ozone generator 1 through the circulating blower 3 and flowing through the gas cooling pipe 36 to thereby supply the cooled oxygen gas to the adsorption/desorption tower 4, and numeral 38 denotes a flow meter for adjusting the flow rate of the oxygen gas flowing through the gas cooling pipe 36.

Operation of the ozone storage system according to the instant embodiment will be described. The ozone storage system has two operation modes, namely, the ozone adsorbing operation mode and the ozone desorbing operation mode. Since the ozone desorbing operation is essentially same as that described hereinbefore in conjunction with the first embodiment, repeated description is omitted. The following description will be directed to the ozone adsorbing operation.

Oxygen gas is supplied from the oxygen supplying source 2 to the circulation system so that the pressure prevailing therein is maintained constantly at a predetermined pressure level. In practical applications, the pressure within the circulation system is usually maintained at a level within a range from 1.5 to 2 $kg/cm^2$. When the oxygen gas is forced to flow through the ozone recirculation system by means of the circulating blower 3 with the changeover valves 8-3 and 8-4 being opened, a part of the oxygen gas is transformed into ozone molecules under the effect of the silent electric discharge when oxygen gas passes through an electric discharge gap provided in the ozone generator 1, whereby ozonized oxygen gas (i.e., oxygen gas containing ozone molecules) is produced to be subsequently transported to the adsorption/desorption tower 4. The adsorbent charged in the adsorption/desorption tower 4 adsorbs selectively the ozone molecules from the ozonized oxygen gas. The residual oxygen gas is led to an influx point or junction between the circulating pipe L1 and the gas cooling pipe 36 by way of the change-over valve 8-3 and the circulating blower 3. Oxygen consumed for the ozonization is supplemented from the oxygen supplying source 2.

At the influx point, the oxygen gas flows through the gas cooling pipe 36 at a flow rate set at the flow meter 38, while the remaining oxygen gas flows into the circulating pipe L1 to be thereby fed back to the ozone generator 1. The oxygen gas flowing into the gas cooling pipe 36 is cooled sufficiently by the cooling unit 37 to be led to an influx point of the gas cooling pipe 36 and the circulating pipe L1 near to the inlet of the adsorption/desorption tower 4.

At the influx point mentioned just above, the ozonized oxygen gas produced by the ozone generator 1 is mixed with the aforementioned cooled oxygen gas, whereby a resulting mixture gas is supplied to the adsorption/desorption tower 4 as the cooled ozonized oxygen gas.

Thus, the adsorbent charged in the adsorption/desorption tower 4 is cooled by the ozonized oxygen gas, whereon the ozone molecules contained in the ozonized oxygen gas are adsorbed by the cooled adsorbent with the ozonized oxygen gas in excess being discharged from the adsorption/desorption tower 4.

In this way, the adsorbent charged in the adsorption/desorption tower 4 can be directly cooled. In other words, the adsorbent can be cooled with high efficiency, which in turn means that energy or electric power required for cooling the adsorption/desorption tower 4 upon starting of the ozone adsorption operation mode can be reduced significantly, to an advantage from the viewpoint of economization.

In the ozone storage system described above, the oxygen gas flow discharged from the adsorption/desorption tower 4 is separated into the oxygen gas for ozone production and the oxygen gas used for cooling the adsorbent. As a modification of such arrangement, the cooling unit 37 may be installed in the circulating pipe L1 at a location close to the outlet or exit of the ozone generator 1 so that the entire gas flowing through the circulating pipe L1 is cooled to thereby allow the cooled and ozonized oxygen gas to be supplied to the adsorption/desorption tower 4. In that case, however, an increased amount of energy will be required for cooling entirely all the ozonized oxygen gas which has undergone heating within the ozone generator 1. To say in another way, when compared with the arrangement in which only a part of the ozonized oxygen gas is heated during passage through the ozone generator 1, the energy consumption will be increased in the ozone storage system in which the entire ozonized oxygen gas is heated in the course of flowing through the ozone generator 1.

Embodiment 14

In the ozone storage system according to the first to thirteenth embodiments described so far, it has been assumed that the single adsorption/desorption tower 4 is employed. By contrast, in the ozone storage system according to a fourteenth embodiment of the invention, it is proposed to connect three adsorption/desorption towers 4 in series, wherein the ozonized oxygen gas discharged from a given one of the adsorption/desorption towers 4 is fed to a succeeding one to thereby allow the ozone molecules to be adsorbed therein.

Figure 25:
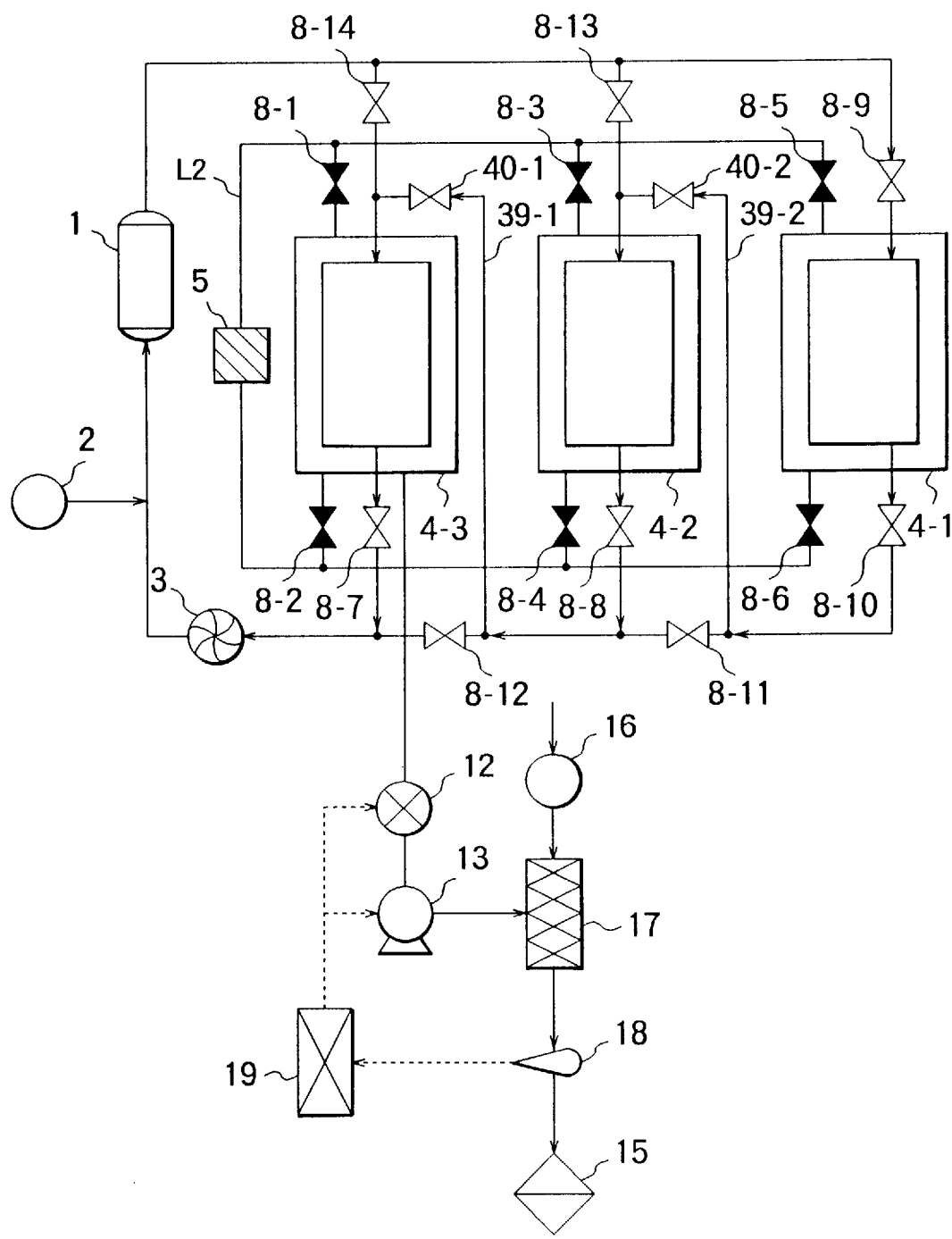
FIG. 25 is a schematic diagram showing generally a structure of an ozone storage system according to a fourteenth embodiment of the present invention.

FIG. 25 is a schematic diagram showing generally a structure of the ozone storage system according to the fourteenth embodiment of the invention. In the figure, components same as or equivalent to those shown in FIG. 24 are designated by like reference characters. Referring to FIG. 25, reference numerals 4-1 to 4-3 denote first to third adsorption/desorption towers or columns, respectively, wherein inlets of inner cylinders or drums of the adsorption/desorption towers 4-1 and 4-2 are connected to the ozonized oxygen gas outlet of the ozone generator 1 by way of change-over valves 40-1 and 40-2, respectively.

On the other hand, ozonized oxygen gas outlets or exits of the adsorption/desorption towers 4-1, 4-2 and 4-3 are operatively connected to the exit of the ozone generator 1 through change-over valves 8-10, 8-11 and 8-7, respectively, by a pipe in which the circulating blower 3 is installed. Thus, the ozonized oxygen gas can be recirculated through the inner cylinders of the adsorption/desorption towers 4-1, 4-2 and 4-3 by way of change-over valves 8-9, 8-13 and 8-14 and the change-over valves 8-10, 8-8 and 8-7, respectively, under the action of the circulating blower 3.

Further, coolant inlets and outlets of the outer cylinders of the adsorption/desorption towers 4-1, 4-2 and 4-3 are operatively connected to the coolant supply source 5 through pairs of change-over valves 8-1; 8-2, 8-3; 8-4 and 8-5; 8-6, respectively, by way of the circulating pipe L2. Thus, a coolant can be recirculated through the outer cylinders of the adsorption/desorption towers 4-1, 4-2 and 4-3 by way of the change-over valves 8-1 to 8-6 and the circulating pipe L2.

The exit of the change-over valve 8-10 disposed at the ozonized oxygen gas exit side of the first adsorption/ desorption tower 4-1 and that of the change-over valve 8-13 disposed at the ozonized oxygen gas entrance side of the second adsorption/desorption tower 4-2 are interconnected by a pipe 39-2 in which the change-over valve 40-2 is installed.

The exit of the change-over valve 8-8 disposed at the ozonized oxygen gas exit side of the second adsorption/desorption tower 4-2 and that of the change-over valve 8-14 disposed at the ozonized oxygen gas entrance side of the third adsorption/desorption tower 4-3 are interconnected by a pipe 39-1 in which the change-over valve 40-1 is installed.

Installed at a location downstream of a junction between the circulating pipe L1 and a pipe 39-2 is a change-over valve 8-11 with a change-over valve 8-12 being installed at a location downstream of a junction between the circulating pipe L1 and the pipe 39-1. These change-over valves 8-11 and 8-12 are normally opened so that the oxygen gas discharged through the change-over valves 8-10 and 8-11 is circulated to the ozone generator 1 by means of the circulating blower 3.

When the change-over valve 40-2 is opened, the change-over valve 8-11 is closed, whereby the ozonized oxygen gas discharged through the change-over valve 8-10 is supplied to the second adsorption/desorption tower 4-2.

On the other hand, when the change-over valve 40-1 is opened, the change-over valve 8-12 is closed, whereby the ozonized oxygen gas discharged through the change-over valve 8-8 is supplied to the third adsorption/desorption tower 4-3.

Next, operation of the multi-tower type ozone storage system according to the instant embodiment of the invention will be described. Operation of this ozone storage system may be classified into two operation modes. They are ozone adsorbing operation mode and ozone desorbing operation mode.

Description will first be directed to the ozone adsorbing operation. The oxygen supplying source 2 supplies an oxygen gas to the circulation system so as to maintain the pressure prevailing therein constantly at a predetermined or given pressure level. In practical applications, the pressure is usually in a range from 1.5 to 2 kg/cm$^2$.

When the oxygen gas is forced to flow through the circulating pipe L1 by the circulating blower 3 in the state in which the change-over valves 8-9, 8-10, 8-11 and 8-12 are opened, a part of the oxygen gas flow is transformed into ozone molecules (i.e., ozonized) under the effect of the silent electric discharge when the oxygen gas passes through an electric discharge gap formed internally of the ozone generator 1, whereby an ozonized oxygen gas is produced to be subsequently-transported at first to the first adsorption/desorption tower 4-1. The adsorbent charged in the first adsorption/desorption tower 4-1 adsorbs selectively the ozone molecules from the ozonized oxygen gas, while the residual oxygen gas is fed back toward the circulating blower 3 by way of the change-over valve 8-10. Parenthetically, the amount of oxygen consumed for the ozonization is supplemented from the oxygen supplying source 2.

When the ozone adsorption operation mode of the first adsorption/desorption tower 4-1 comes close to an end (i.e., the state in which the adsorbent charged in the first adsorption/desorption tower 4-1 approaches to the saturated state) with ozone leaking from the first adsorption/desorption tower 4-1, the change-over valve 8-11 is closed while the change-over valves 8-8 and 40-2 are opened, whereby the ozonized oxygen gas discharged from the first adsorption/desorption tower 4-1 is supplied to the second adsorption/desorption tower 4-2, whereupon the ozone adsorption operation mode is started in the second adsorption/desorption tower 4-2.

Further, when the ozone adsorption operation mode of the second adsorption/desorption tower 4-2 comes close to an end with ozone start to leak from the first adsorption/desorption tower 4-1, the change-over valve 8-12 is closed with the change-over valves 8-7 and 40-1 being opened, whereby the ozonized oxygen gas discharged from the second adsorption/desorption tower 4-2 is supplied to the third adsorption/desorption tower 4-3, whereupon the ozone adsorption operation mode is activated in the third adsorption/desorption tower 4-3.

By executing repetitively the process mentioned above, ozone can be stored successively in the plural adsorption/desorption towers 4-1 to 4-3. Thus, with the arrangement of the multi-tower type ozone storage system according to the instant embodiment, there can be achieved advantageously the effect that ozone as produced can be stored with highly enhanced efficiency.

Furthermore, when the first adsorption/desorption tower 4-1 has reached the equilibrium adsorption state (i.e., the state in which the ozone concentration of the ozonized oxygen gas discharged from the first adsorption/desorption tower 4-1 becomes constant at a level close to the ozone concentration of the ozonized oxygen gas fed to the first adsorption/desorption tower 4-1), the change-over valves 8-9, 8-10 and 40-2 are closed with the change-over valve 8-13 being opened concurrently, as a result of which the ozonized oxygen gas is directly supplied to the second adsorption/desorption tower 4-2.

The process mentioned above is repeated, whereby ozone is stored in the plural adsorption/desorption towers 4-1, 4-2 and 4-3 successively. By storing ozone in this way, pressure loss occurring upon supplying of the ozonized oxygen gas to the adsorption/desorption towers 4-1, 4-2 and 4-3 can be reduced, which in turn means that the load imposed on the circulating blower 3 is mitigated. Thus, there can be achieved advantageously such effect that the amount of energy consumed in the ozone adsorption operation mode can be reduced.

In this conjunction, decision as whether or not the adsorption/desorption tower 4-1, 4-2 or 4-3 has reached the equilibrium adsorption state may be made by monitoring the ozone concentration of the ozonized oxygen gas. Alternatively, the time taken for each of the adsorption/desorption towers 4-1 to 4-3 to reach the equilibrium adsorption state may be previously determined experimentally, and in actual applications, operations of the adsorption/desorption towers 4-1 to 4-3 may be controlled straightforwardly by using a timer or timers set correspondingly.

Now, description will turn to an ozone storing method in the serially connected multiple tower type ozone storage system according to the instant embodiment of the invention. In this conjunction, it has experimentally been established that the amount of adsorption of ozone at the time the ozone leakage occurs in the adsorption/desorption tower 4 (i.e., when the adsorption breakthrough phenomenon takes place) is about 40% of the amount of ozone adsorbed up to a time point when the adsorbent charged in the adsorption/desorption tower 4 has reached the equilibrium state. This means that by continuing adsorption of ozone until the equilibrium state has been attained, ozone adsorption efficiency given by the amount of ozone adsorbed per unit weight of the adsorbent can be increased, whereby the adsorption/desorption tower 4 may be realized in a small or compact size. However, in that case, because the amount of ozone discharged from the adsorption/desorption tower 4 without being adsorbed also increases, the ozone utilization efficiency becomes lowered.

By contrast, in the case of the multi-tower type ozone storage system according to the instant embodiment of the invention in which the ozonized oxygen gas leaked from the first adsorption/desorption tower 4-1 is supplied to the second adsorption/desorption tower 4-2 for allowing the ozone molecules contained in the ozonized oxygen gas to be adsorbed for storage, not only high efficiency of utilization of ozone as produced but also high ozone adsorption efficiency can be achieved because the ozone adsorption can be continued until the adsorbent charged in the first adsorption/desorption tower 4-1 has reached the equilibrium state. More specifically, the ozone gas leaked from the final-stage i.e., the third adsorption/desorption tower 4-3 can no more be adsorbed as in the case of the single-tower type ozone storage system, ozone as produced can be stored with a higher efficiency over the single-tower type ozone storage system. Furthermore, owing to the enhanced ozone adsorption efficiency, the adsorption/desorption tower 4 can be implemented with a small capacity.

In the ozone adsorption operation mode, it is preferred to start to cool the adsorption/desorption tower 4 immediately before starting the ozone injection from the viewpoint of energy economization of energy. In that case, it is important to carry out the ozone adsorption for storage by maintaining the ozone concentration of the ozonized oxygen gas discharged from the adsorption/desorption tower 4 after ozone adsorption constantly at a level not higher than a preset concentration until the temperature within the adsorption/desorption tower 4 has reached a preset value.

Parenthetically, the individual adsorption/desorption tower 4 for which the ozone adsorption for storage has come to an end should be maintained in the state cooled to the preset temperature until the entire adsorption process of the entire multi-tower ozone storage system has been completed.

When the ozone concentration of the ozonized oxygen gas discharged from the third or final-stage adsorption/desorption tower 4-3 exceeds a preset concentration level, operation of the multi-tower ozone storage system is changed over to the ozone desorbing operation mode. To this end, operations of the ozone generator 1, the circulating blower 3 and the coolant supply source 5 are stopped with the change-over valves 8-1, 8-2, 8-7 and 8-14 being closed. Subsequently, the gas suction pump 13 is put into operation with the flow-path cross-sectional area of the ozone gas flow regulating unit 12 being increased gradually, to thereby allow the ozone gas to be supplied to the gas mixing unit 17. At the same time, a carrier gas is supplied to the gas mixing unit 17 from the carrier gas generator 16. Thus, the ozone gas and the carrier gas are mixed together by the gas mixing unit 17, whereby an ozone containing gas is produced to be supplied to the ozone consumer 15.

When the ozone desorption process in the third adsorption/desorption tower 4-3 comes close to an end, the change-over valves 40-1 and 8-8 are opened to allow ozone stored in the second adsorption/desorption tower 4-2 to be fed to the third adsorption/desorption tower 4-3. In that case, the third adsorption/desorption tower 4-3 plays a role of a buffer. Thus, discharge of ozone in a large amount is prevented in the initial phase of the ozone desorption operation mode. By carrying out the ozone desorbing process from one to another of the plural adsorption/desorption towers 4 (i.e., 4-2 and 4-1 in the case of the illustrated system) with the desorbed ozone molecules being caused to flow through the third adsorption/desorption tower 4-3, the ozone containing gas which contains ozone at a predetermined concentration can be supplied to the ozone consumer 15 stably.

In the foregoing description, it has been assumed that when ozone is to be discharged from one of plural adsorption/desorption towers (4-1 and 4-2) after evacuation of the third adsorption/desorption tower 4-3, either the first adsorption/desorption tower 4-1 or the second adsorption/desorption tower 4-2 from which ozone is to be evacuated subsequently is operatively connected in series to the third adsorption/desorption tower 4-3. However, as an alternative ozone desorbing method, all the adsorption/desorption towers 4 (i.e., 4-1, 4-2 and 4-3) may be operatively connected in series to one another before starting the ozone desorption operation mode, whereupon extraction of ozone may be started from the third adsorption/desorption tower 4-3.

According to the alternative method mentioned just above, ozone can be extracted continuously throughout the entire desorption process. Thus, the control for the ozone desorption process can be facilitated, to an advantage. However, in that case, the number of the adsorption/desorption towers 4 through which the ozone gas has to flow increases, as the ozone desorption process progresses toward the adsorption/desorption tower 4 which is to be finally evacuated, as a result of which the amount of ozone discharged from the multi-tower type ozone storage system decreases because the decomposition rate of ozone molecules increases. Besides, because the pressure loss involved in the suction of ozone increases, there arises a problem that a pump of large capacity will be required as the gas suction pump 13.

Additionally, such an ozone desorbing or extracting method may equally be adopted in which ozone is first taken out from the third adsorption/desorption tower 4-3. As the amount of the ozone molecules desorbed becomes lower, the second adsorption/desorption tower 4-2 is connected in series to the third adsorption/desorption tower 4-3 to extract the ozone molecules. When the amount of ozone taken out becomes again lower, then the first adsorption/desorption tower 4-1 is additionally connected in series so that all the adsorption/desorption towers 4-3, 4-2 and 4-1 are finally connected in series to one another.

With the method described just above, the control of the ozone concentration of the ozonized oxygen gas to be supplied to the ozone consumer 15 can be facilitated when compared with the ozone desorption process in the single-tower type ozone storage system. However, the number of the adsorption/desorption towers 4 which the ozone gas has to flow through increases, as the ozone desorption process progresses toward the adsorption/desorption tower 4 which is to be finally evacuated (e.g. the tower 4-1 in the illustrative case), as a result of which the amount of ozone discharged from the multi-tower type ozone storage system decreases because the decomposition rate of ozone will then increase. Besides, because the pressure loss involved in the suction of ozone increases, there may arise a problem that a pump of large capacity is required as the gas suction pump 13.

Embodiment 15

In the ozone storage system described so far, no description has been made concerning the measures for ensuring the safety of the ozone storage system upon occurrence of service interruption (i.e., when electric power supply to the ozone storage system is interrupted in the course of operation of the ozone storage system). A fifteenth embodiment of the invention is directed to an ozone storage system equipped with the facility for coping with such service interruption. Basically, ozone stored in the adsorption/desorption tower 4 is decomposed by an ozone decomposing agent upon occurrence of service interruption. Gas resulting from the decomposition and containing substantially no ozone molecules is exhausted to the atmosphere.

Figure 26:
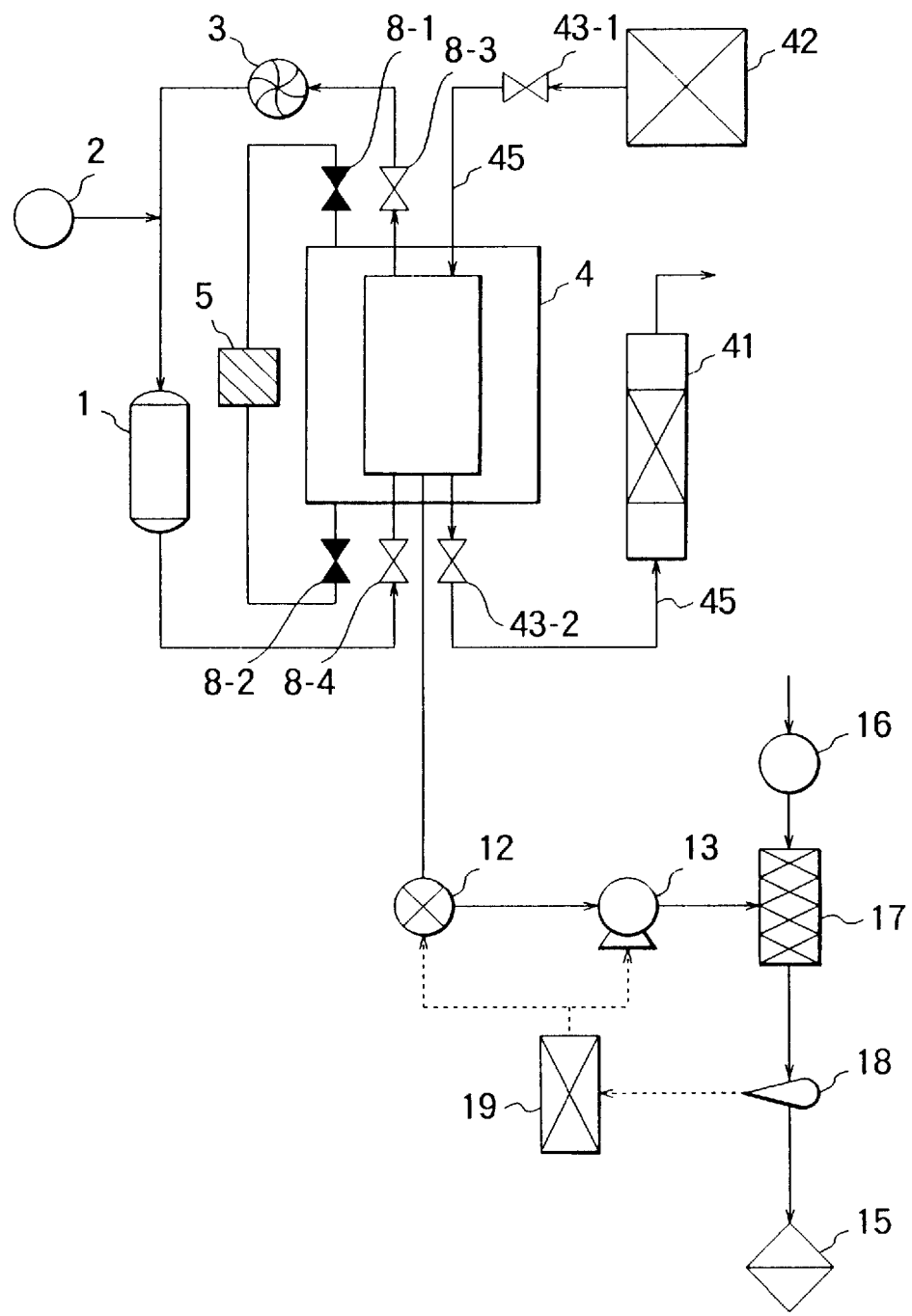
FIG. 26 is a schematic diagram showing generally a structure of an ozone storage system according to a fifteenth embodiment of the present invention.

FIG. 26 is a schematic diagram showing generally a structure of the ozone storage system according to the fifteenth embodiment of the present invention. In the figure, components same as or equivalent to those shown in FIG. 24 are designated by like reference characters. Referring to FIG. 26. In the ozone storage system according to the instant embodiment of the invention, there is provided an ozone decomposing tower 41 charged with an ozone decomposing agent, wherein the ozone decomposing tower 41 is fluidally communicated to the ozonized oxygen gas exit side of the adsorption/desorption tower 4 by way of a pipe 45 in which a power-off open type electromagnetic valve 43-2 is installed.

Further, the ozone storage system shown in FIG. 26 includes a compressed gas storage tank 42 for reserving a compressed gas for the purpose of dealing with emergency event such as the service interruption mentioned above, wherein the compressed gas storage tank 42 is connected to the adsorption/desorption tower 4 at the ozonized oxygen gas inlet side thereof by way of a pipe 45 in which a power-off open type electromagnetic valve 43-1 is mounted. As the ozone decomposing agent to be charged in the ozone decomposing tower 41, there may be mentioned activated carbon, "SEKARD" or the like.

Now, description will be made of operation of the ozone storage system according to the instant embodiment. The ozone storage system has two operation modes. However, since these operation modes are same as those described hereinbefore in conjunction with the first embodiment, repetition is omitted and the following description will be directed to the operation of the ozone storage system triggered upon occurrence of the service interruption. When the service interruption (power-off event) takes place during the desorbing operation, operations of the ozone generator 1, the circulating blower 3 and the coolant supply source 5 are stopped with the change-over valves 8-1, 8-2, 8-3 and 8-4 being closed under the control of a control unit (not shown).

In succession, the power-off open type electromagnetic valve 43-1 is opened, whereby the compressed gas contained in the compressed gas storage tank 42 is supplied to the adsorption/desorption tower 4. Under the purging action of the compressed gas, ozone stored in the adsorption/desorption tower 4 is extracted to be led to the ozone decomposing tower 41 as an ozone containing gas through the power-off open type electromagnetic valve 43-2 which is .in the opened state at that time. In the ozone decomposing tower 41, ozone is decomposed to be discharged as the exhaust gas containing no ozone to the atmosphere.

With the arrangement of the ozone storage system described above, explosion accident can positively be prevented. Such explosion may otherwise occur, because desorption of ozone from the adsorbent filled in the adsorption/desorption tower 4 is promoted due to the temperature rise within the adsorption/desorption tower 4 brought about by the service interruption, as a result of which the concentration of ozone trapped within the adsorption/desorption tower 4 increases to a level that may bring about explosion event. Parenthetically, it is generally admitted that the ozone concentration of ca. 30% by weight is likely to incur such explosion event.

In the ozone storage system described just above, the power-off open type electromagnetic valves 43-1 and 43-2 are provided so that the emergency function can be activated immediately upon occurrence of service interruption. It should however be appreciated that the aimed effect can equally be achieved by providing a mechanical timer (not shown) in combination with the power-off open type electromagnetic valves 43 so that upon lapse of a predetermined time from the occurrence of service interruption, the valves are opened to allow ozone to be discharged from the adsorption/desorption tower 4. With this arrangement, the ozone storage system can be restored to the state prevailing before the occurrence of the service interruption when the normal power supply state is resumed early, advantageously to effective operation of the ozone storage system.

Embodiment 16

In the case of the ozone storage system according to the fifteenth embodiment, the compressed gas contained in the compressed gas storage tank 42 is fed to the adsorption/desorption tower 4 upon occurrence of the service interruption, wherein ozone molecules adsorbed and stored in the adsorption/desorption tower 4 are desorbed under the purging action of the compressed gas to be subsequently introduced to the ozone decomposing tower 41 as an ozone containing gas.

According to the invention incarnated in a sixteenth embodiment thereof, the ozonized oxygen gas is discharged from the adsorption/desorption tower 4 to the ozone decomposing tower 41 by taking advantage of increasing of the pressure prevailing within the adsorption/desorption tower 4 due to desorption of oxygen promoted by the temperature rise after the occurrence of the service interruption.

Figure 27:
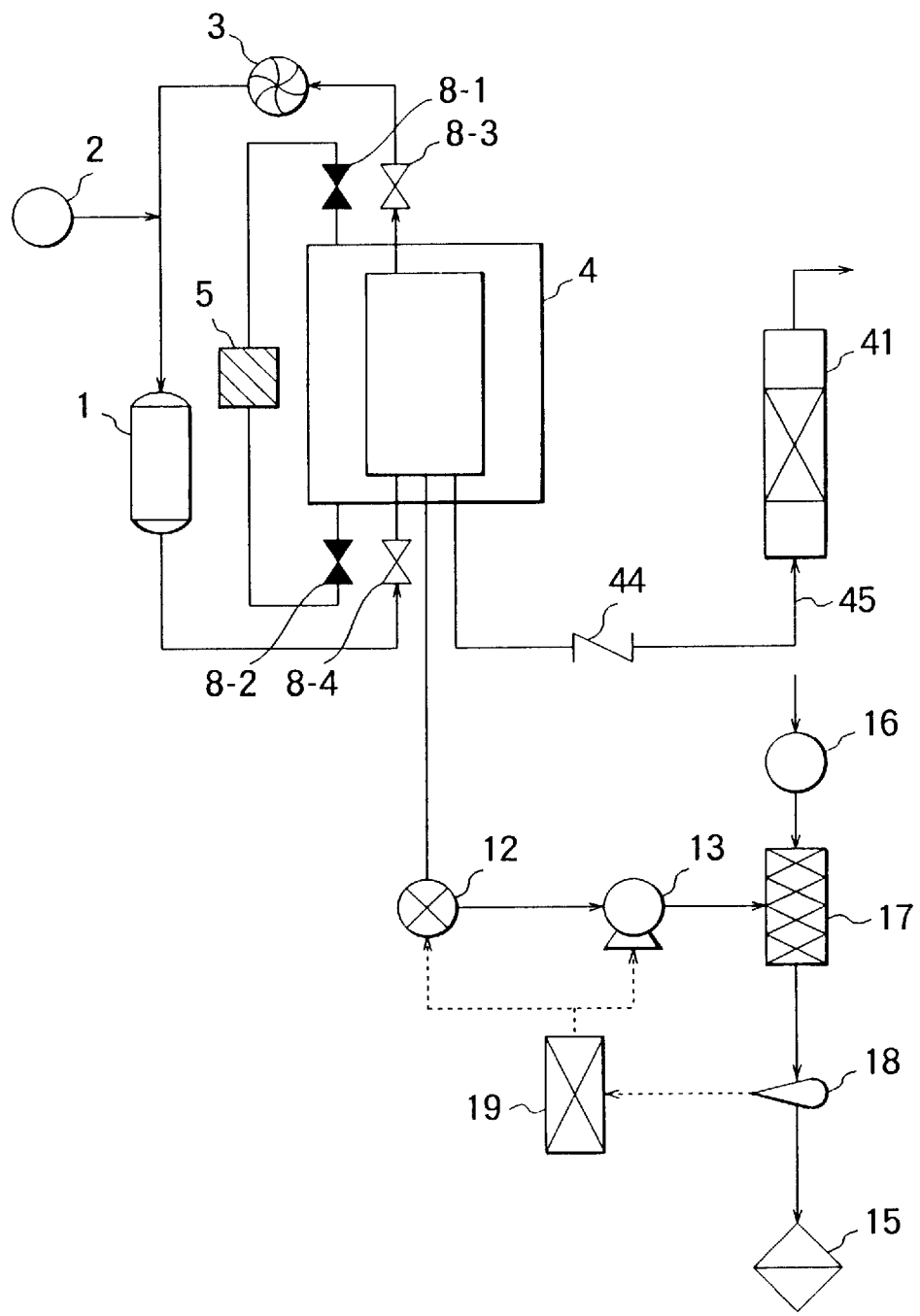
FIG. 27 is a schematic diagram showing generally a structure of an ozone storage system according to a sixteenth embodiment of the present invention.

FIG. 27 is a schematic diagram showing a structure of the ozone storage system according to the instant embodiment of the invention. In the figure, components same as or equivalent to those shown in FIG. 26 are denoted by like reference characters. In FIG. 27, reference numeral 44 denotes a pressure-driven type relief valve installed in a pipe 45 interconnecting the ozone decomposing tower 41 and the adsorption/desorption tower 4.

Description will be made of operation of the ozone storage system according to the instant embodiment. The ozone storage system has two operation modes. However, since these operation modes are same as those described herein-before in conjunction with the first embodiment, repetition is omitted, and the following description will be directed to the operation of the ozone storage system upon occurrence of abnormality in the coolant supply source 5 due to the service interruption.

When the service interruption (power-off event) takes place during the desorbing operation, operations of the coolant supply source 5, the ozone generator 1 and the circulating blower 3 are stopped with the change-over valves 8-1, 8-2, 8-3 and 8-4 being closed. When operation of the coolant supply source 5 stops, the temperature within the adsorption/desorption tower 4 rises up, as a result of which desorption of ozone is promoted to increase the pressure within the adsorption/desorption tower 4. When the pressure increases to a level preset at the pressure-driven type relief valve 44, operation thereof is triggered to allow the ozonized oxygen gas to be discharged from the adsorption/desorption tower 4 and led to the ozone decomposing tower 41. In the ozone decomposing tower 41, ozone is decomposed to be discharged to the atmosphere as the exhaust gas containing no ozone.

At this juncture, it should be added that the value or level of the pressure within the adsorption/desorption tower 4 at which the ozone concentration attains the value of 30% by weight may experimentally be determined beforehand, and the pressure-driven type relief valve 44 may be so set that the operation thereof is triggered before the aforementioned pressure level is attained. Alteratively, an ozone densimeter for measuring the ozone concentration within the adsorption/desorption tower 4 may be provided to cause the pressure-driven type relief valve 44 to be driven in dependence on the concentration level indicated by the ozone densimeter.

With the arrangement of the ozone storage system described above, trapping of ozone within the adsorption/desorption tower 4 at a high concentration due to the promoted desorption of ozone under the influence of temperature rise, which may otherwise lead to unwanted accident, can be prevented positively.

Many modifications and variations of the present invention are possible in the light of the above techniques. It is therefore to be understood that within the scope of the appended claims, the invention may be practiced otherwise than as specifically described.

What is claimed is:

1. A method of storing ozone, comprising the steps of:
   generating an ozonized oxygen gas from an oxygen containing gas with an ozone generating means (1) by using electric energy; and
   supplying said ozonized oxygen gas to at least one adsorption/desorption means (4) to thereby allow adsorption of ozone for storage by said adsorption/desorption means;
   wherein in said adsorption of ozone by said adsorption/desorption means, a partial pressure of ozone contained in said ozonized oxygen gas is increased incrementally.

2. A method of storing ozone, comprising the steps of:
   generating an ozonized oxygen gas from an oxygen containing gas with an ozone generating means (1) by using electric energy;
   supplying said ozonized oxygen gas to at least one adsorption/desorption means (4) to thereby allow ozone to be adsorbed for storage by said adsorption/desorption means (4); and
   extracting ozone stored in said adsorption/desorption means (4) by supplying a desorption inducing gas to said adsorption/desorption means (4) while maintaining a negative pressure within said adsorption/desorption means (4);
   wherein in said ozone extracting step, a flow rate of said desorption inducing gas is so regulated so as to allow ozone to be desorbed with a predetermined desorption rate.

3. An ozone storage method according to claim 2, wherein said desorption inducing gas is an oxygen gas.

4. An ozone storage system, comprising:
   ozone generating means (1) for generating an ozonized oxygen gas from a gas containing oxygen;
   adsorption/desorption means (4) including adsorbing means for selectively adsorbing ozone from said ozonized oxygen gas by an adsorbent, and desorbing means for desorbing ozone from said adsorbent;
   circulation path means (L1) for feeding back said oxygen containing gas to said ozone generating means (1) after adsorption of ozone by said adsorption/desorption means (4);
   ozone discharging means (11) for discharging ozone desorbed from said adsorption/desorption means (4); and
   ozone concentration controlling means (14) for adjusting an amount of ozone extracted through said ozone discharging means (11) to thereby supply an ozone containing gas which contains ozone substantially constantly at a predetermined concentration to an ozone consumer (15).

5. An ozone storage system according to claim 4, wherein said ozone discharging means (11) includes:
   ozone flow rate regulating means (12) for regulating the rate at which ozone is discharged by said ozone concentration controlling means (14); and
   ozone suction pump means (13) for sucking ozone from said adsorption/desorption means (4) by way of said ozone flow rate regulating means (12).

6. An ozone storage system according to claim 5, wherein said ozone discharging means (11) includes:
   compressed carrier gas introducing means (23, 24) for introducing a compressed carrier gas into said adsorption/desorption means (4);
   ozone extracting means for extracting ozone from said adsorption/desorption means (4) by suction under depressurization by way of said ozone flow rate regulating means (12); and
   gas ejector means (21) for mixing ozone with said compressed carrier gas to thereby supply ozone containing gas to the ozone consumer (15).

7. An ozone storage system according to claim 4, wherein said ozone concentration controlling means (14) includes:
   gas mixing means (17) for mixing ozone discharged under the effect of suction effectuated by said ozone discharging means (11) with a carrier gas, wherein ozone containing gas resulting from said mixing is supplied to the ozone consumer (15).

8. An ozone storage system according to claim 4, further comprising:
   low-temperature processing means (20) for generating at least liquid oxygen by liquidizing air as introduced and separating oxygen therefrom;
   wherein liquid oxygen is vaporized to be thereby transformed into oxygen containing gas which is then supplied to said ozone generating means (1).

9. An ozone storage system according to claim 4, further comprising:
   heat exchanging means (28) for transferring heat carried by the ozonized oxygen gas discharged from said ozone generating means (1) to the oxygen containing gas discharged from said adsorption/desorption means (4) and fed back to said circulation path means (L1, etc.).

10. An ozone storage system according to claim 4, further comprising:
    pressure regulating means (29) for changing pressure within said circulation path means (L1) through which the ozonized oxygen gas and the oxygen containing gas flow.

11. An ozone storage system according to claim 4, further comprising:
    ozone concentration regulating means (33) for regulating concentration of ozone contained in the ozonized oxygen gas supplied to said adsorption/desorption means (4).

12. An ozone storage system according to claim 4, wherein said ozone discharging means includes:

oxygen gas introducing means (35) for introducing an oxygen gas flow to said adsorption/desorption means (4) later in an ozone desorbing process to thereby promote substitution of adsorbed ozone by introduced oxygen.

13. An ozone storage system according to claim 4, further comprising:

bypass pipe means (36) provided for circulation path means for circulating the oxygen containing gas between said adsorption/desorption means (4) and said ozone generating means (1) so that a part of the oxygen containing gas is supplied to said adsorption/desorption means (4); and cooling means (37) provided in association with said bypass pipe means (36) for cooling the oxygen containing gas flowing through said bypass pipe means (36).

14. An ozone storage system according to claim 4, comprising:

a plurality of said adsorption/desorption means (4-1 to 4-3) disposed in a serial array;

wherein ozonized oxygen gas outlets and ozonized oxygen gas inlets of adjacent ones of said plurality of adsorption/desorption means (4-1 to 4-3) are connected in series by pipes (39-1, 39-2) having change-over valves (40-1, 40-2) installed therein, respectively, so that said plurality of adsorption/desorption means (4-1 to 4-3) constitute adsorption/desorption stages in series, respectively;

wherein at each of said adsorption/desorption stages, the adsorbent of corresponding adsorption/desorption means adsorbs ozone upon reception of the ozonized oxygen gas introduced from the adjacent adsorption/desorption means by way of said pipe (39-1, 39-2); and wherein desorption of ozone is started from the adsorption/desorption means (4-3) corresponding to a final adsorption/desorption stage.

15. An ozone storage system according to claim 4, wherein:

said ozone discharging means (42, 43-1, 43-2) discharges ozone stored in said adsorption/desorption means (4) upon occurrence of interruption of electric power supply to said system; and further comprising ozone decomposing means (41) for decomposing ozone discharged from said adsorption/desorption means (4) for thereby transforming said ozone gas into a gas containing no ozone.

* * * * *